US011859921B1

(12) United States Patent
Kelly et al.

(10) Patent No.: US 11,859,921 B1
(45) Date of Patent: Jan. 2, 2024

(54) MICROTUBE HEAT EXCHANGER

(71) Applicants: Kevin W. Kelly, Baton Rouge, LA (US); David Craig, Baton Rouge, LA (US)

(72) Inventors: Kevin W. Kelly, Baton Rouge, LA (US); David Craig, Baton Rouge, LA (US)

(73) Assignee: International Mezzo Technologies, Inc., Baton Rouge, LA (US)

( * ) Notice: Subject to any disclaimer, the term of this patent is extended or adjusted under 35 U.S.C. 154(b) by 94 days.

(21) Appl. No.: 16/805,715

(22) Filed: Feb. 29, 2020

(51) Int. Cl.
| | |
|---|---|
| *F28F 19/00* | (2006.01) |
| *F28F 9/02* | (2006.01) |
| *F28F 1/10* | (2006.01) |
| *B64D 15/04* | (2006.01) |
| *B64D 13/06* | (2006.01) |

(52) U.S. Cl.
CPC ............... *F28F 19/00* (2013.01); *F28F 1/10* (2013.01); *F28F 9/0246* (2013.01); *B64D 15/04* (2013.01); *B64D 2013/0618* (2013.01); *F28F 2260/02* (2013.01)

(58) Field of Classification Search
CPC .. F28F 19/00; F28F 1/10; F28F 9/0246; F28F 2260/02; B64D 15/04; B64D 2013/0618
USPC ........................................................ 165/143
See application file for complete search history.

(56) References Cited

U.S. PATENT DOCUMENTS

| | | | | |
|---|---|---|---|---|
| 4,676,305 A | * | 6/1987 | Doty | F28D 7/1653 165/158 |
| 4,885,141 A | * | 12/1989 | Gray | C02F 1/688 422/263 |
| 4,928,755 A | * | 5/1990 | Doty | F28D 7/0041 165/168 |
| 5,267,605 A | * | 12/1993 | Doty | B64G 1/503 165/133 |
| 6,415,860 B1 | * | 7/2002 | Kelly | F28F 7/02 165/148 |
| 6,892,802 B2 | * | 5/2005 | Kelly | F28F 7/02 165/148 |
| 7,156,159 B2 | * | 1/2007 | Lovette | F28F 3/12 165/104.33 |
| 7,198,096 B2 | * | 4/2007 | Parish, IV | F28D 15/0233 165/104.33 |
| 10,005,018 B2 | * | 6/2018 | Hayes | C01B 23/0057 |
| 10,553,522 B1 | * | 2/2020 | Canaperi | H01L 23/373 |
| 2002/0125001 A1 | * | 9/2002 | Kelly | F28F 7/02 165/165 |
| 2006/0157234 A1 | * | 7/2006 | Golecki | F28F 19/00 165/170 |
| 2006/0162910 A1 | * | 7/2006 | Kelly | F28F 7/02 165/148 |
| 2010/0032150 A1 | * | 2/2010 | Determan | F28D 15/0266 165/246 |

(Continued)

FOREIGN PATENT DOCUMENTS

CN 211743291 U * 10/2020

*Primary Examiner* — Jianying C Atkisson
*Assistant Examiner* — Raheena R Malik
(74) *Attorney, Agent, or Firm* — Emily L. Gordy; Carver, Darden, Koretzky, Tessier, Finn, Blossman & Areaux, LLC

(57) ABSTRACT

This invention relates to a light weight microtube heat exchanger that meets all the performance requirements of more conventional plate-fin heat exchangers (thermal performance, shock and vibration, and weight, etc.) while providing significant improvements with respect to air-side fouling due to sand and dirt or weight reduction.

6 Claims, 25 Drawing Sheets

(56) References Cited

U.S. PATENT DOCUMENTS

| | | | | |
|---|---|---|---|---|
| 2010/0230081 A1* | 9/2010 | Becnel | ............... | F28D 1/05333 165/173 |
| 2011/0024037 A1* | 2/2011 | Becnel | ............... | F28D 1/05333 156/295 |
| 2012/0324909 A1* | 12/2012 | Brehm | ................... | F01N 5/025 62/3.2 |
| 2021/0247139 A1* | 8/2021 | Fausett | ................ | B33Y 80/00 |

* cited by examiner

MICROTUBE HEAT EXCHANGER

STATEMENT OF FUNDING

The U.S. Government has provided support for the making of, and has certain rights in, this invention as provided for by the terms of Contract No. N6833518C0189 awarded by the U.S. Department of the Navy.

BACKGROUND OF THE INVENTION

The present invention relates to a microtube heat exchanger. A heat exchanger is a device used to transfer thermal energy between two or more fluids (wherein fluids includes gases and/or liquids) or between a solid surface and a fluid. In most heat exchangers, heat transfer between fluids takes place through a separating wall.

Heat exchangers are used in various aircraft to cool a variety of fluids. For example, many aircraft incorporate heat exchangers that cool oil used to lubricate gearboxes and drive hydraulic systems. Additionally, heat exchangers are used to cool compressed air (also referred to as "bleed air") so that the air may used for various on-board functions (such as in the aircraft's heating, ventilation and air conditioning system or the aircraft's anti-icing system).

Plate-fin heat exchangers are the type of heat exchanger most often used in aircraft to cool these lubricating oils or bleed air. A plate-fin heat exchanger is a type of heat exchanger design that uses alternating layers of plates separated by layers of fins. Typically, a fluid (oil or high-pressure bleed air, for example) flows through channels within the plates and within the plane of the heat exchanger orthogonal to the direction of ambient air flow, and the ambient air flows through the front face of the heat exchanger, exchanging energy with the fluid indirectly via the fins before exiting the back face. This design is often used in aircraft due to its compact nature and its relatively high heat transfer surface area to volume ratio.

However, plate-fin heat exchangers used in aircraft are susceptible to specific problems. For example, due to their design, a plate-fin heat exchanger that is both compact and provides good thermal performance typically has relatively small, tortuous air-side passages and can be susceptible to air flow fouling, or in other words, becoming clogged with sand and dust. This air flow fouling reduces air flow and can cause overheating. Additionally, the time required to clean fouled plate-fin heat exchangers is excessively long, often involving removal of the heat exchanger from the aircraft.

Moreover, in applications wherein the fluid temperature of at least one of fluid is relatively high (greater than 500-600 F) thereby precluding the use of aluminum in the heat exchanger, microtube heat exchangers can provide significant weight advantages over competing plate-fin heat exchangers due to a significantly reduced mass of the microtube heat exchangers.

Heat exchangers for use in aircraft must also be able to withstand foreign object damage, sand erosion, corrosion, and shock and vibrations. Heat exchangers for aerospace applications must further be relatively light weight.

The present invention of a light weight microtube heat exchanger is deemed to meet the foregoing needs and to address the foregoing problems by providing a heat exchanger that meets all the performance requirements of more conventional plate-fin heat exchangers (thermal performance, shock and vibration, and weight, etc.) while providing significant improvements with respect to air-side fouling due to sand and dirt or significant weight reduction.

These and other embodiments and features of the present invention will become even more apparent from the following detailed description of various embodiments, the accompanying figures and the appended claims.

SUMMARY OF THE INVENTION

This invention relates to a heat exchanging unit comprising a core, wherein said core is comprised of a plurality of microtubes having a first end and a second end, wherein said plurality of microtubes are arranged so that said plurality of microtubes are parallel to each other. The core further comprises a first tube sheet and a second tube sheet wherein said first and second tube sheets are substantially planar and parallel to each other, and wherein said first and second tube sheets each comprise an array of tube apertures, optionally in a rectangular (in-line) pattern. Said array of tube apertures of said first tube sheet are adjacent to said first ends of said plurality of microtubes and said array of tube apertures of said second tube sheet are adjacent to said second ends of said plurality of microtube sheets. Further, the invention comprises metal bonds wherein said metal bonds join each of said first ends of the plurality of microtubes to said first tube sheet and joins each of said second ends of said plurality of microtubes to said second tube sheet.

In another aspect of this invention, the invention comprises a heat exchanging unit comprising a baseplate and multiple heat exchanging subunits attached to said baseplate wherein each of said multiple heat exchanging subunits are capable of cooling a separate fluid. Further, each of said heat exchanging subunits comprises a core, wherein said core is comprised of a plurality of microtubes having a first end and a second end, and wherein said plurality of microtubes are arranged so that each of said plurality of microtubes are parallel to each other, and optionally in a rectangular (in-line) pattern. The core further comprises a first tube sheet and a second tube sheet wherein said first and second tube sheets are substantially planar and parallel to each other and wherein said first and second tube sheets comprise an array of tube apertures. Said array of tube apertures of said first tube sheet are adjacent to said first ends of said plurality of microtubes and said array of tube apertures of said second tube sheet are adjacent to said second ends of said plurality of microtubes. Further, the invention comprises a metal bond wherein said metal bond joins each of said first ends of the plurality of microtubes to said first tube sheet and joins each of said second ends of said plurality of microtubes to said second tube sheet.

Figure 1:
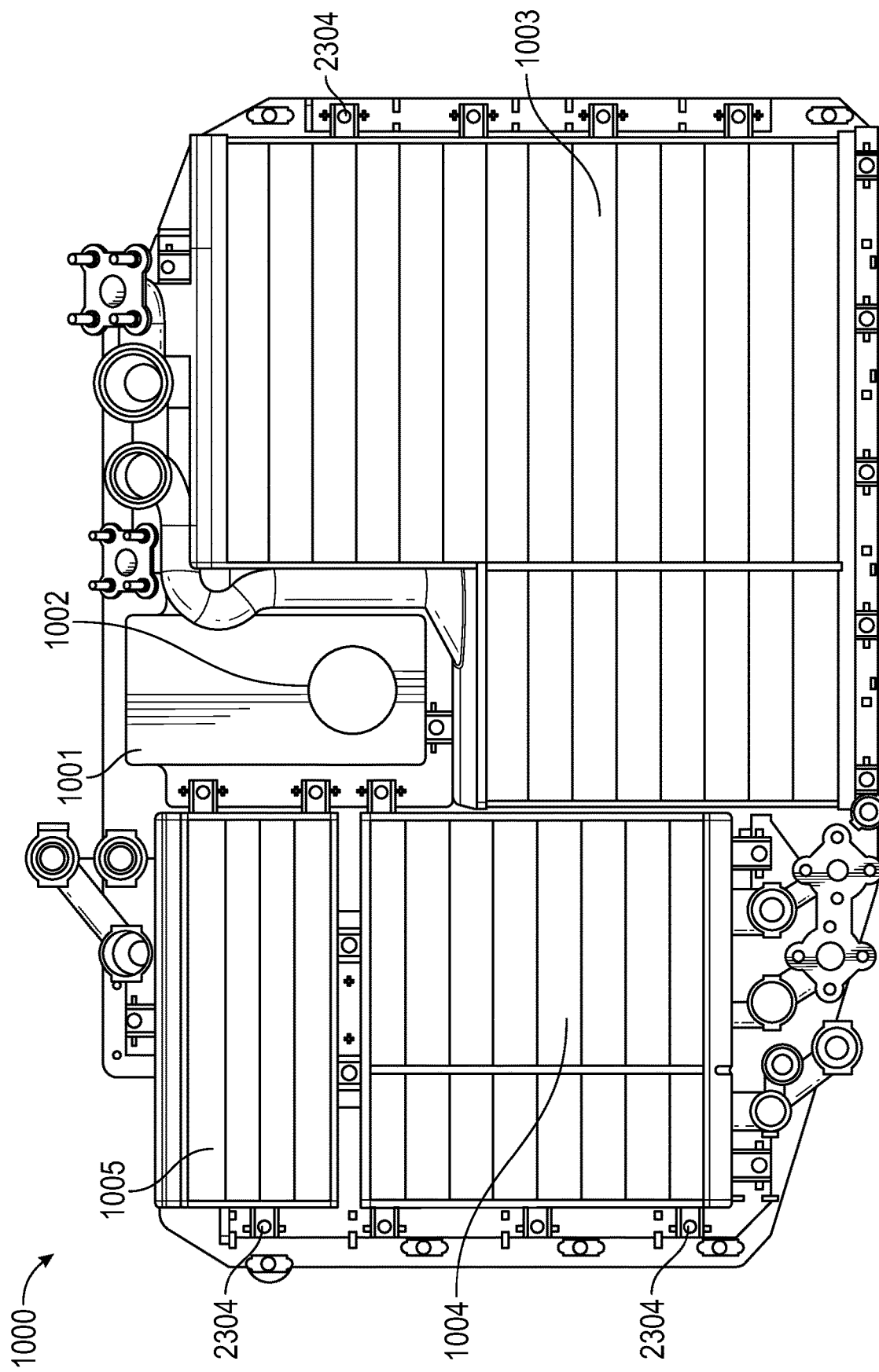
FIG. 1 is a front view of a heat exchanger comprising three heat exchanging subunits.

The images in the drawings depict the heat exchanger for "left hand" installation. The heat exchanger may alternatively be manufactured for "right hand" installation. In such case, the figures for the "right hand" installation will be mirror images of the "left hand" installation figures. There may be slight differences in design between "left hand" and "right hand" heat exchangers, but the major design concepts of the two units are identical.

The images in the drawings are simplified for illustrative purposes. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION OF THE INVENTION

Heat Exchanger with Single Heat Exchanging Unit

FIGS. 24, 25, 26 AND 27 illustrate an exemplary embodiment of an aircraft heat exchanger 1000 comprising a single heat exchanging unit 1100 used, for example, to cool bleed air from an aircraft engine. However, the invention is not limited to the exemplary embodiment contained in FIGS. 24, 25, 26 and 27.

The embodiment of the single heat exchanging unit 1100 depicted in FIGS. 24-27 is advantageous insofar that it pre-cools bleed air of the aircraft engine in a single, compact, light-weight unit. The heat exchanging unit 1100 is made from stainless steel or a higher temperature alloy such as one of the high temperature nickel alloys. In one embodiment, the stainless steel is 304 stainless steel, in another embodiment, the nickel alloy is Inconel 625. Other suitable materials may be used. The stainless-steel or nickel alloy design allows for each element of the unit to be welded to each other (as compared to using stainless steel and aluminum—which cannot be welded together). Welding is especially advantageous in designing a heat exchanger 1000 for an aircraft due to the shock and vibration incurred during aircraft use.

The single heat exchanging unit comprises two tanks—an inlet tank 1101 above the core 2307 and an outlet tank 1102 below the core 2307. An inlet tube sheet 1103 separates the inlet tank 1101 from the core 2307 and an outlet tube sheet 1104 separates the outlet tank 1102 from the core 2307. Additionally, an inlet port 1105 is connected to the inlet tank 1101 and an outlet port 1106 is connected to the outlet tank 1102.

Figure 24:
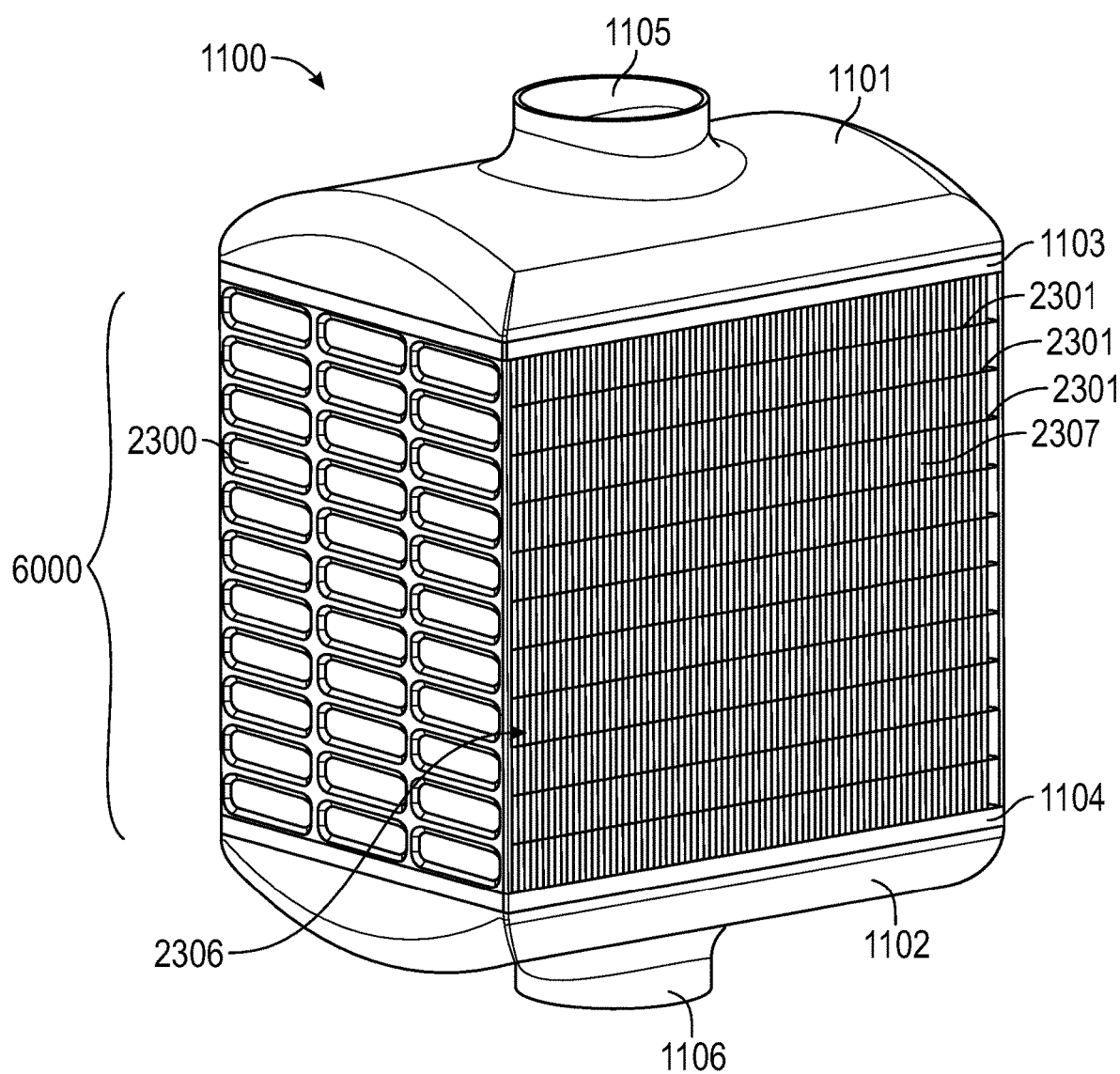
FIG. 24 is a perspective view of a heat exchanger comprising a single heat exchanging unit.
Figure 25:
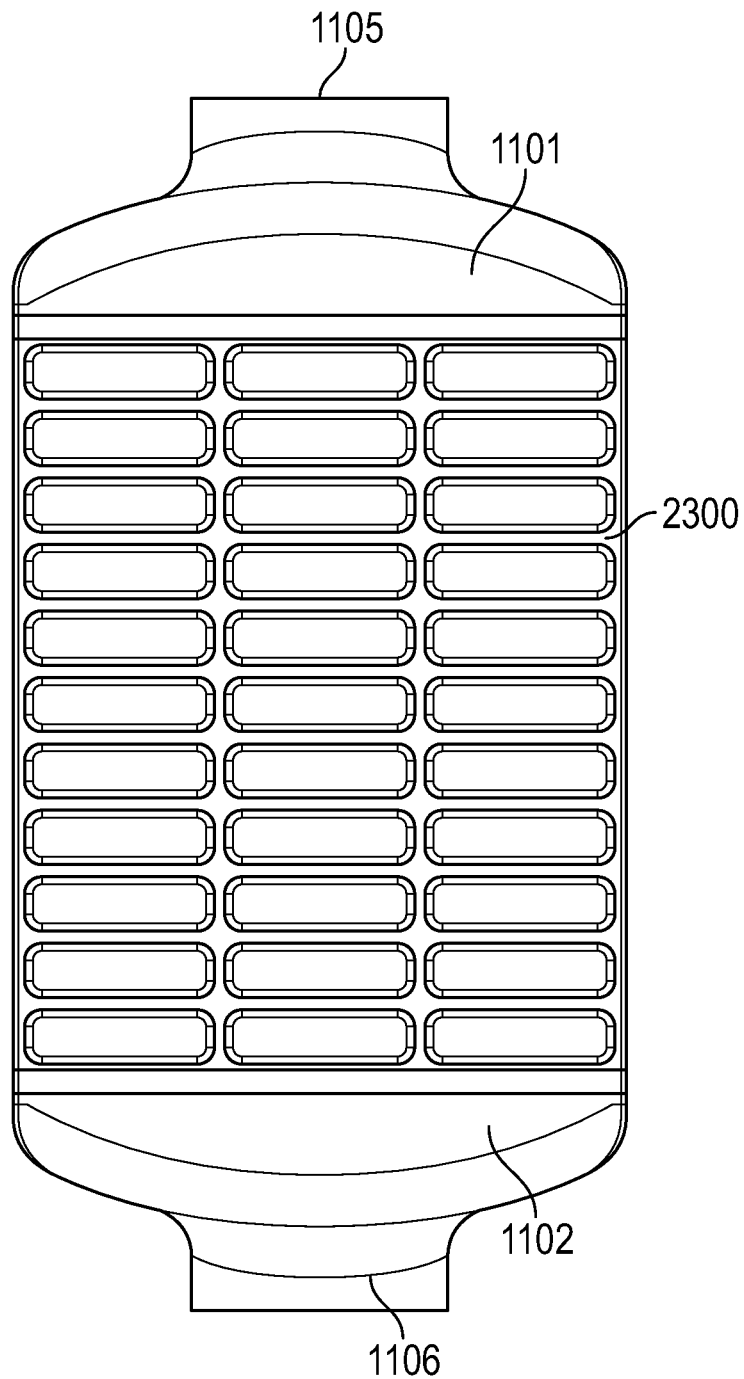
FIG. 25 is a side view of a heat exchanger comprising a single heat exchanging unit.
Figure 26:
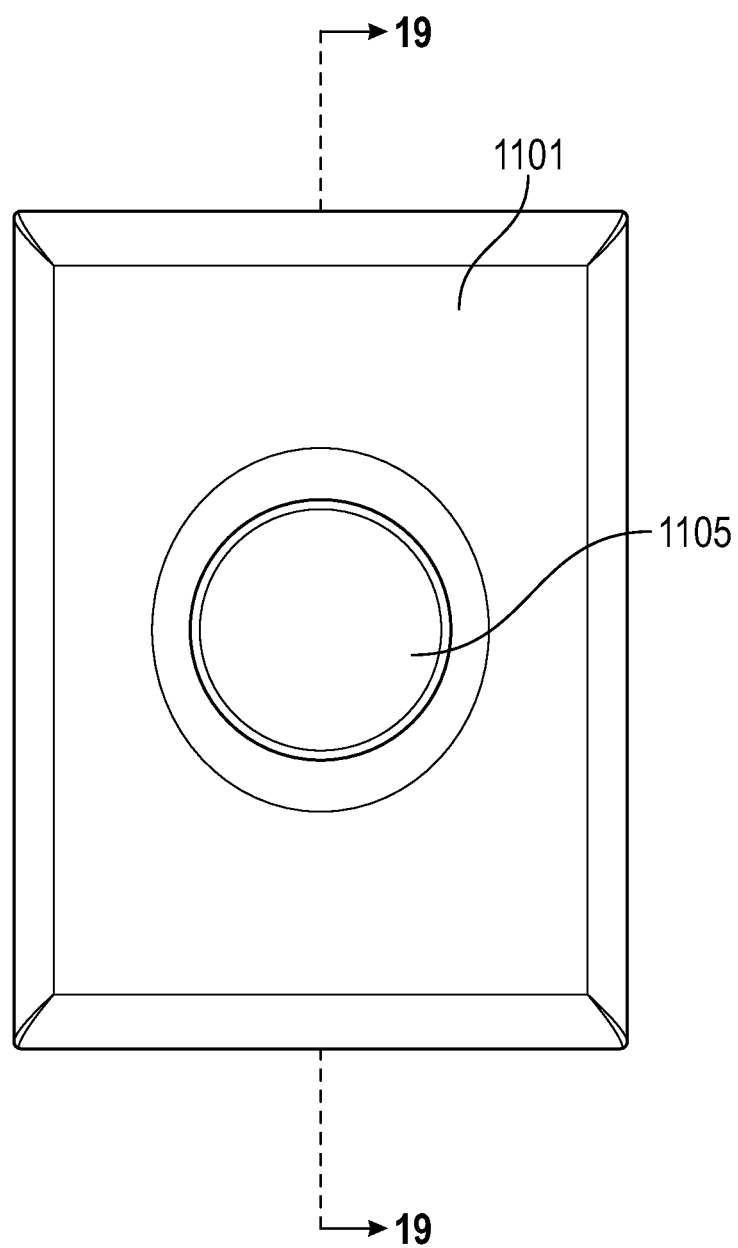
FIG. 26 is a top view of a heat exchanger comprising a single heat exchanging unit.
Figure 27:
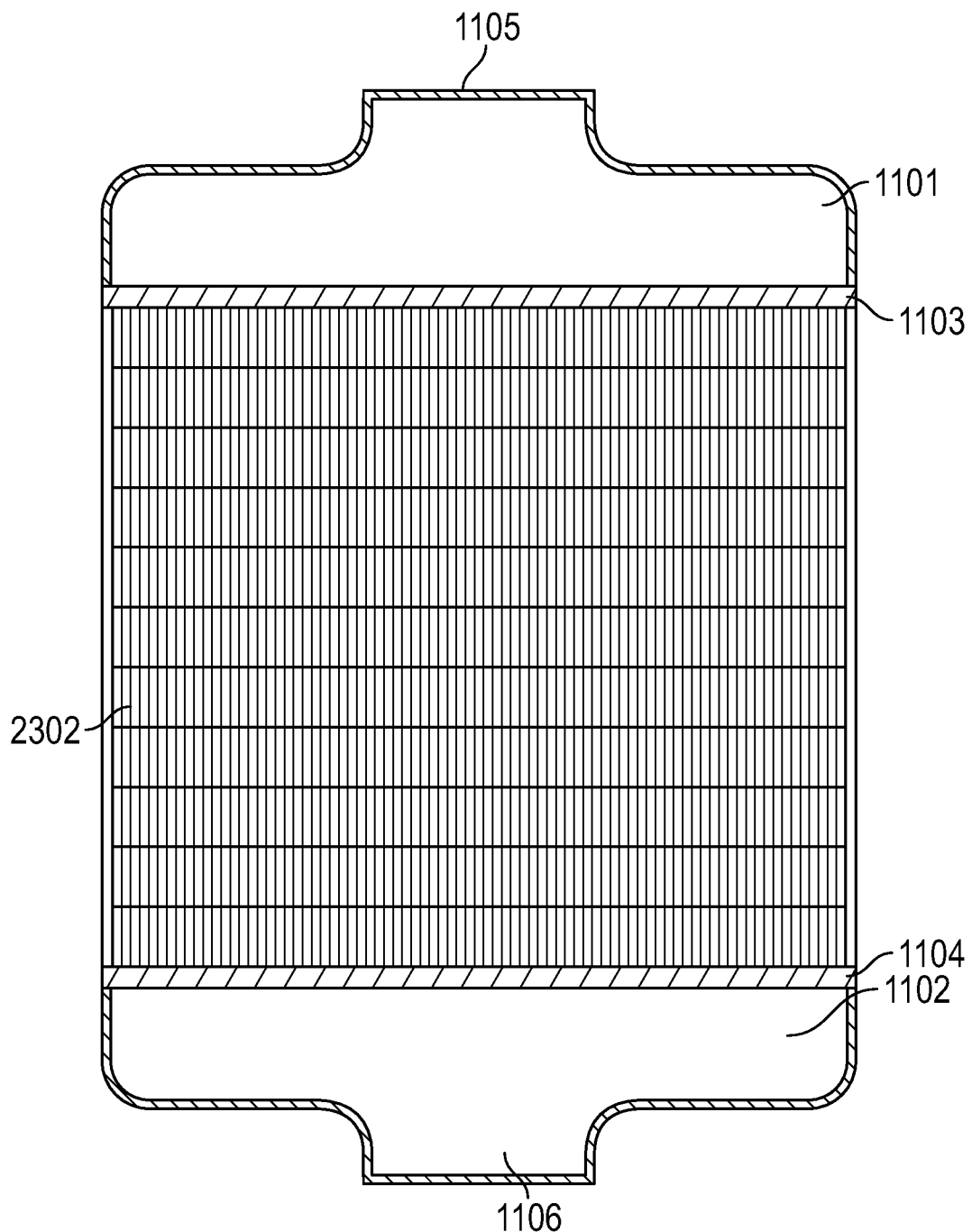
FIG. 27 is a cross-section view of a heat exchanger comprising a single heat exchanging unit taken along the line 19-19 of FIG. 26.

FIGS. 24-25 further depict the elements of the core 2307 (the inlet tube sheet 1103, the microtubes 2302, midplates 2301, sideplates 2300 and solid rods 2306 (if present) and the outlet tube sheet 1104). The microtubes 2302 are attached to the inlet tube sheet 1103 at the tops and to the outlet tube sheet 1104 at the bottoms. Also, midplates 2301 are spaced along the length of the microtubes 2302 to provide additional support to the microtubes 2302. Solid rods 2306 are also located along the leading face 6000 (and further optionally at the trailing face of the core to prevent damage during handling of the single heat exchanging unit 1100) of the core 2307 at which air enters the heat exchanging unit 1100.

The bleed air (or other fluid to be cooled) enters the heat exchanging unit 1100 through the inlet port 1105 and flows to the inlet tank 1101. From the inlet tank 1101 the bleed air (or other fluid to be cooled) flows through the inlet tube sheet 1103 and into the microtubes 2302. Upon leaving the microtubes 2302, the bleed air (or other fluid to be cooled), now cooled, flows through the outlet tube sheet 1104, into the outlet tank 1102 and out through the outlet port 1106.

Heat Exchanger with Multiple Heat Exchanging Subunits

Figure 2:
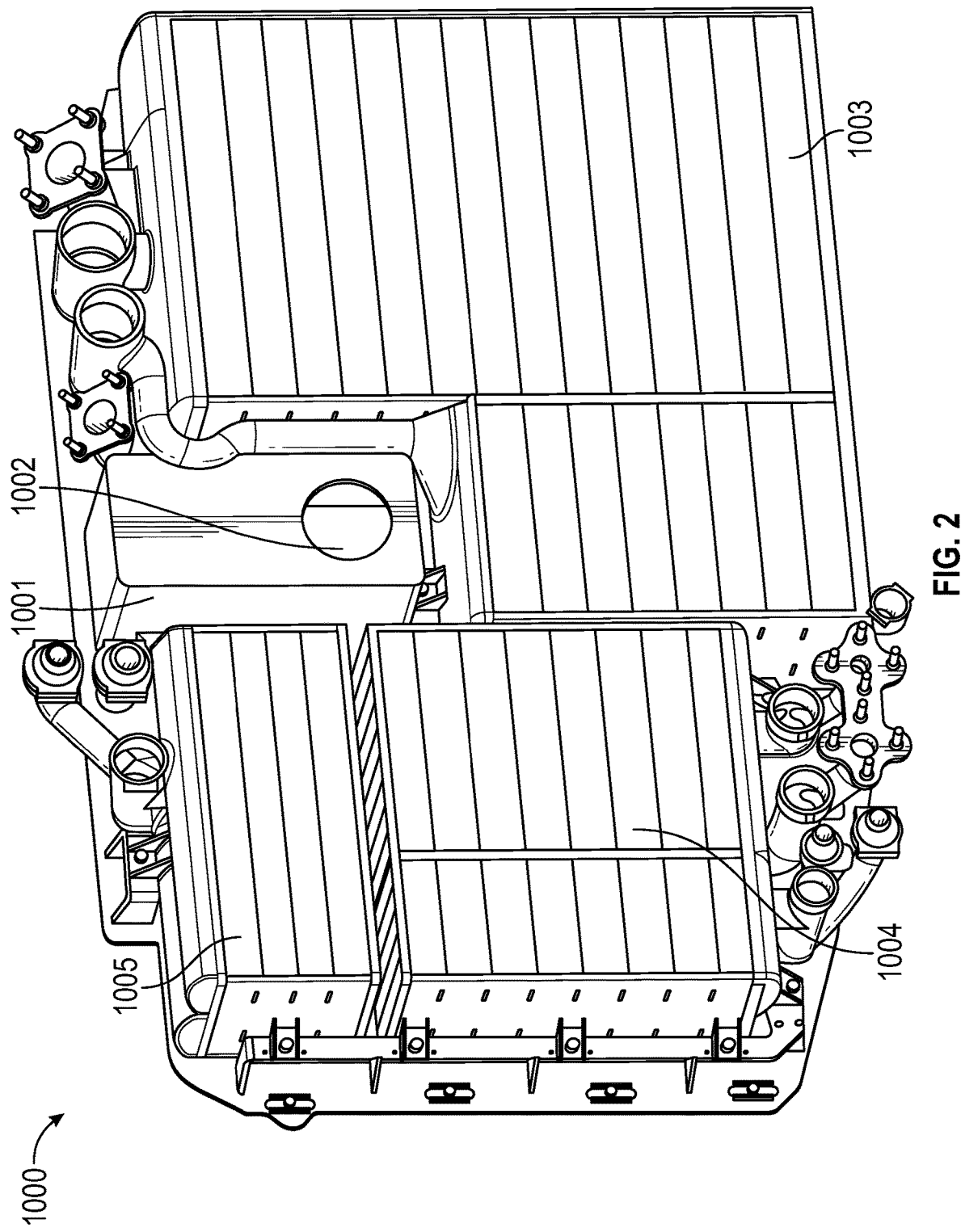
FIG. 2 is a perspective view of a front of a heat exchanger comprising three heat exchanging subunits.
Figure 3:
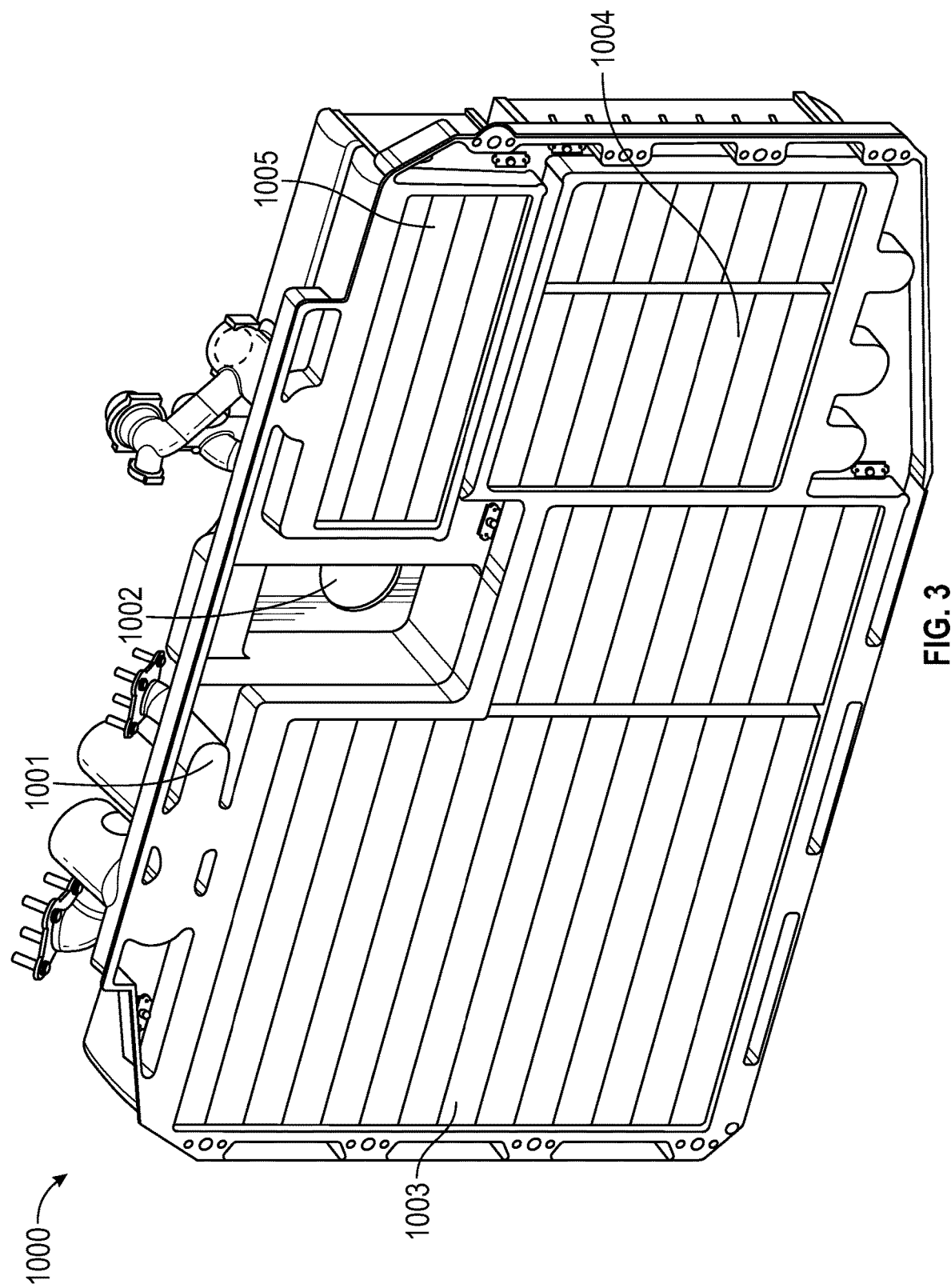
FIG. 3 is a perspective view of a back of a heat exchanger comprising three heat exchanging subunits.
Figure 4:
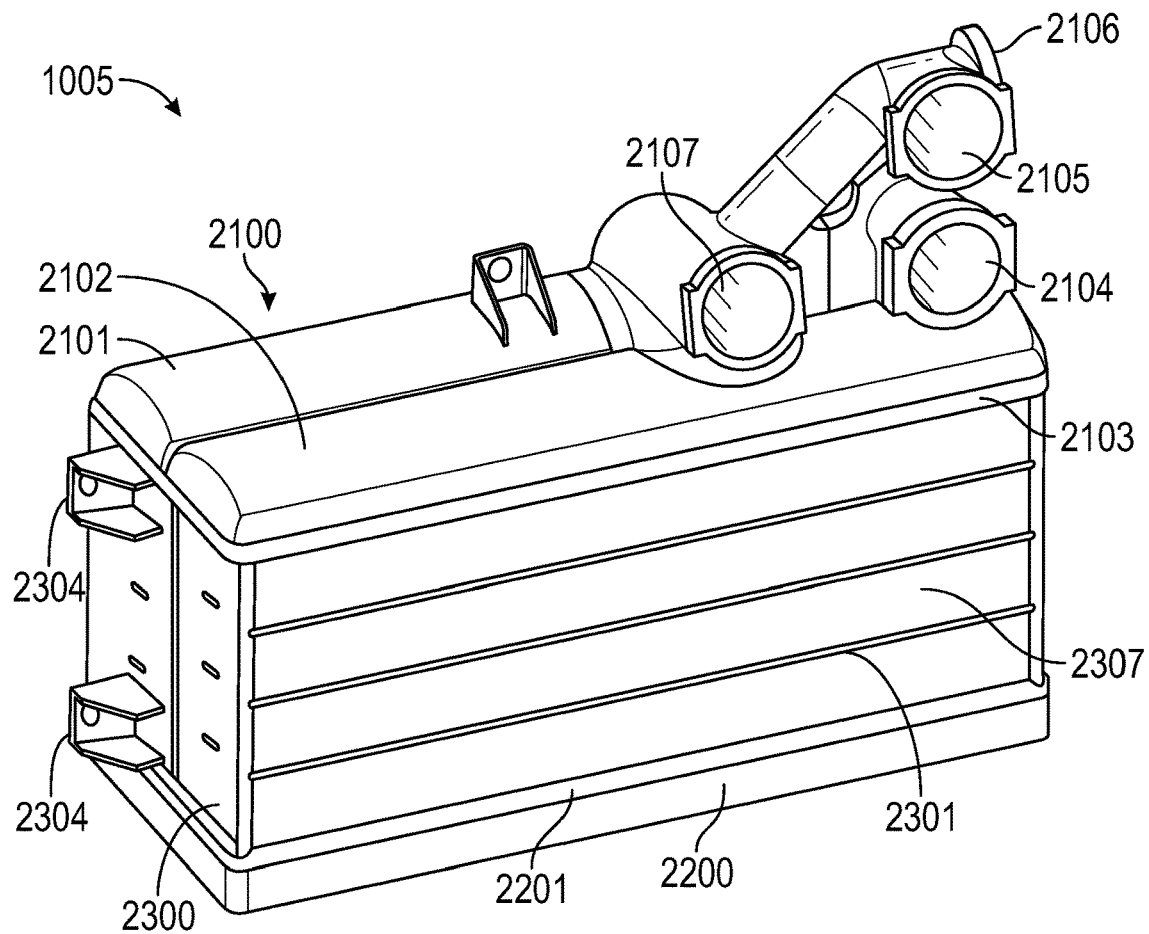
FIG. 4 is a perspective view of a hydraulic subunit of a heat exchanger comprising three heat exchanging subunits.
Figure 5:
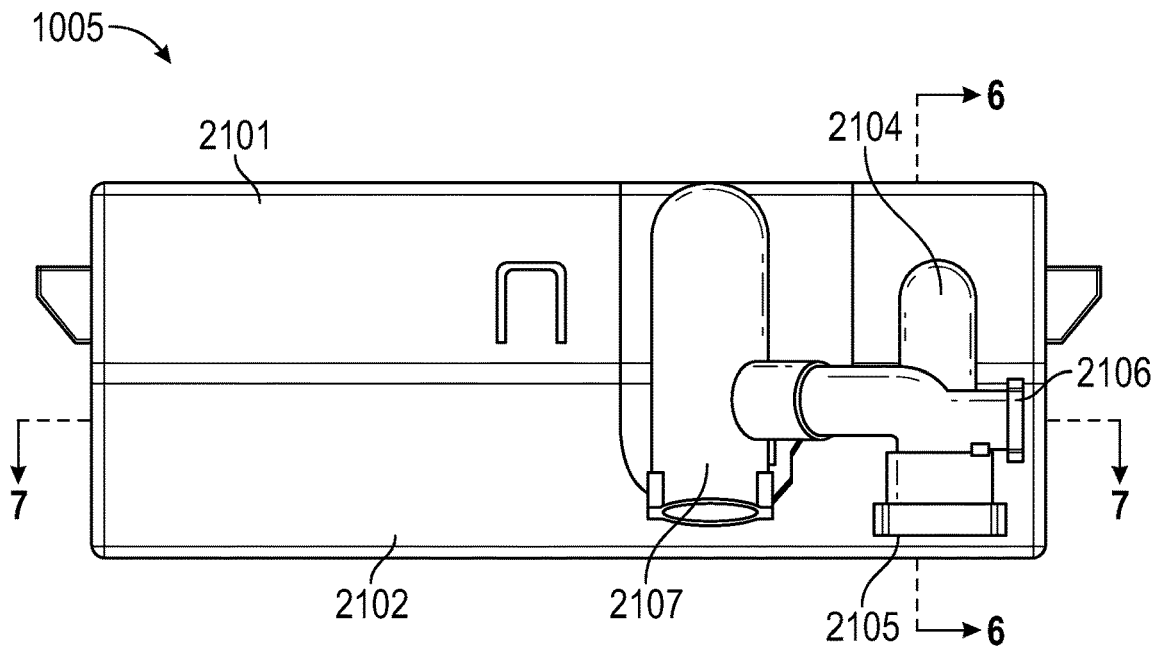
FIG. 5 is a top view of a hydraulic subunit of a heat exchanger comprising three heat exchanging subunits.

FIGS. 1, 2 and 3 illustrate an exemplary embodiment of a heat exchanger 1000 for an aircraft—specifically for the Bell Boeing V-22 Osprey—used to cool the fluids of the engine, gearbox and hydraulic systems. However, the invention is not limited to the exemplary embodiment contained in FIGS. 1, 2 and 3. The V-22 Osprey's propulsion system consists of dual counter rotating proprotors attached to gearboxes driven by turboshaft engines. The engines, proprotor gearboxes, tilt-axis gearboxes, and proprotor controls are all housed in the rotating nacelle on the end of each wing.

FIGS. 1, 2 and 3 depict certain features of an exemplary embodiment of heat exchanger 1000 for a V-22 Osprey, namely, a PRGB subunit 1003, TAGB/GEN subunit 1004 and HYD subunit 1005 that are secured to a baseplate 1001 via mechanical means (such as screws, bolts, or similar means known in the industry). The embodiment of the heat exchanger 1000 depicted in FIG. 1 is advantageous insofar that it cools multiple lubricating oil systems for the Osprey aircraft—the oil system for the tilt axis gear box (TAGB), the engine (GEN), prop-rotor gearbox (PRGB) and the hydraulic (HYD) system—in a single, compact, light-weight unit. The baseplate 1001 further includes a shaft aperture 1002. When installed in a V-22 Osprey, the engine shaft (not depicted) will pass through the shaft aperture 1002 and it is the engine fan that suctions surrounding air through the heat exchanger 1000.

The PRGB subunit 1003, TAGB/GEN subunit 1004 and HYD subunit 1005 of the heat exchanger 1000 are made from stainless steel. In one embodiment, the stainless steel is 304 stainless steel. This stainless-steel design allows for each element of these units to be welded to each other (as compared to using stainless steel and aluminum—which cannot be welded together). Welding is especially advantageous in designing a heat exchanger 1000 for an aircraft due to the shock and vibration incurred during aircraft use. In one embodiment, the baseplate 1001 is comprised of 5052 aluminum and the PRGB subunit 1003, TAGB/GEN subunit 1004 and HYD subunit 1005 are mechanically fastened (using screws, bolts or other means known in the industry) to the baseplate 1001 via the exterior supports 2304.

HYD Subunit:

FIGS. 4, 5, 6 and 7 depict an exemplary embodiment of the HYD subunit 1005. The heat exchanger core 2307 of HYD subunit 1005 comprises the HYD port tube sheet 2103, the microtubes 2302, midplates 2301, sideplates 2300 and solid rods 2306 (if present) and the HYD port tube sheet 2201. Joined to the top side of the HYD subunit 1005 core 2307 are two parallel portside tanks 2100—a HYD inlet tank 2101 and a HYD outlet tank 2102. A HYD inlet port 2104 is located above the HYD inlet tank 2101 and the oil to be cooled is flowed through the HYD inlet port 2104 into the HYD inlet tank 2101. A HYD outlet port 2105 is located above the HYD outlet tank 2102 and the oil, after it is cooled, flows out of the HYD outlet tank 2102, through the HYD outlet port 2105 and away from the heat exchanger 1000. The HYD turnside tank 2200 is attached to the bottom of core 2307. The HYD subunit 1005 further comprises a HYD oil bypass valve port 2107 located above the portside tanks 2100, and a HYD bleed port 2106 connected to the HYD outlet port 2105.

Figure 6:
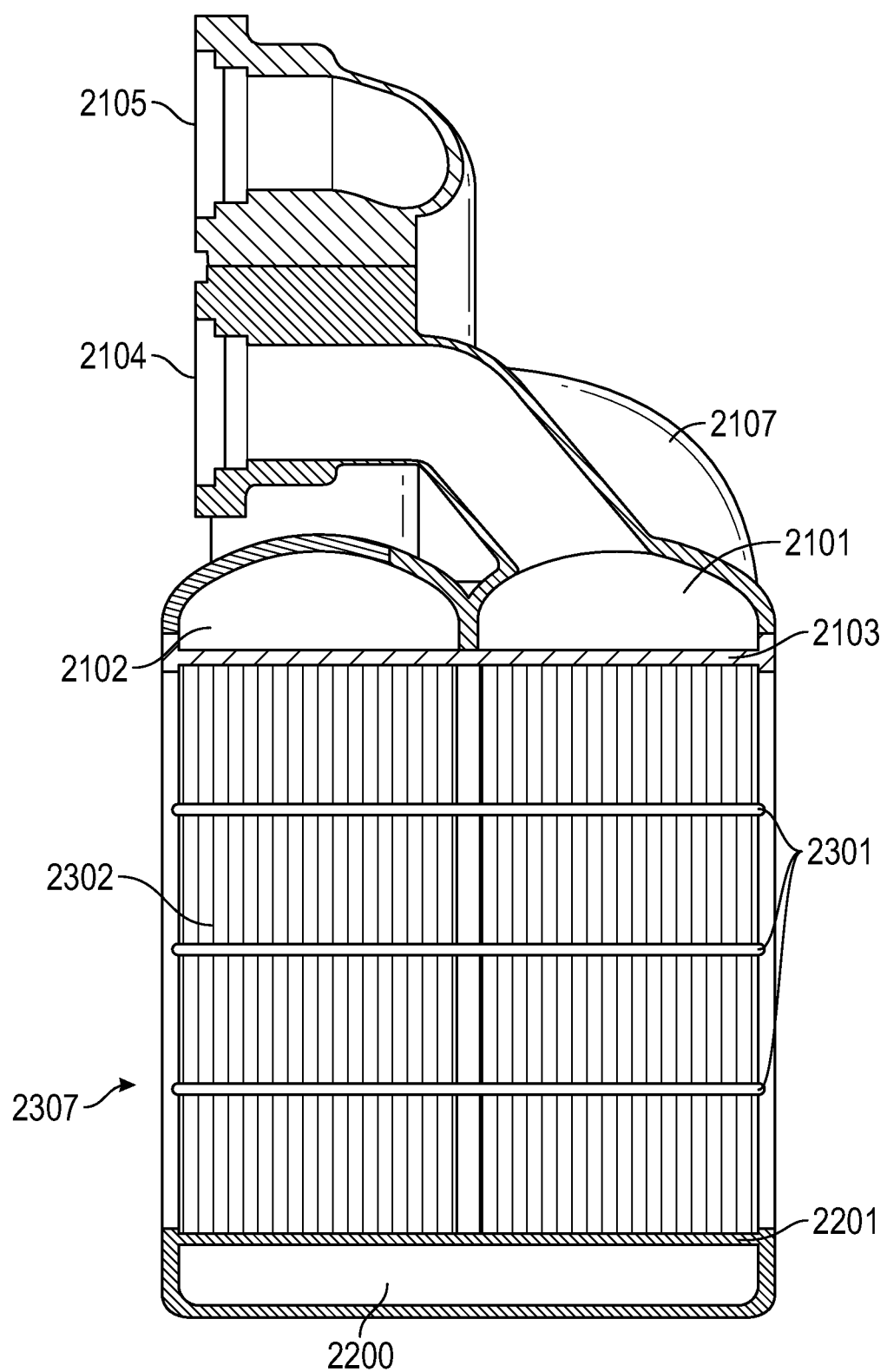
FIG. 6 is a first cross section view of a hydraulic subunit of a heat exchanger comprising three heat exchanging subunits taken on the line 6-6 of FIG. 5.
Figure 7:
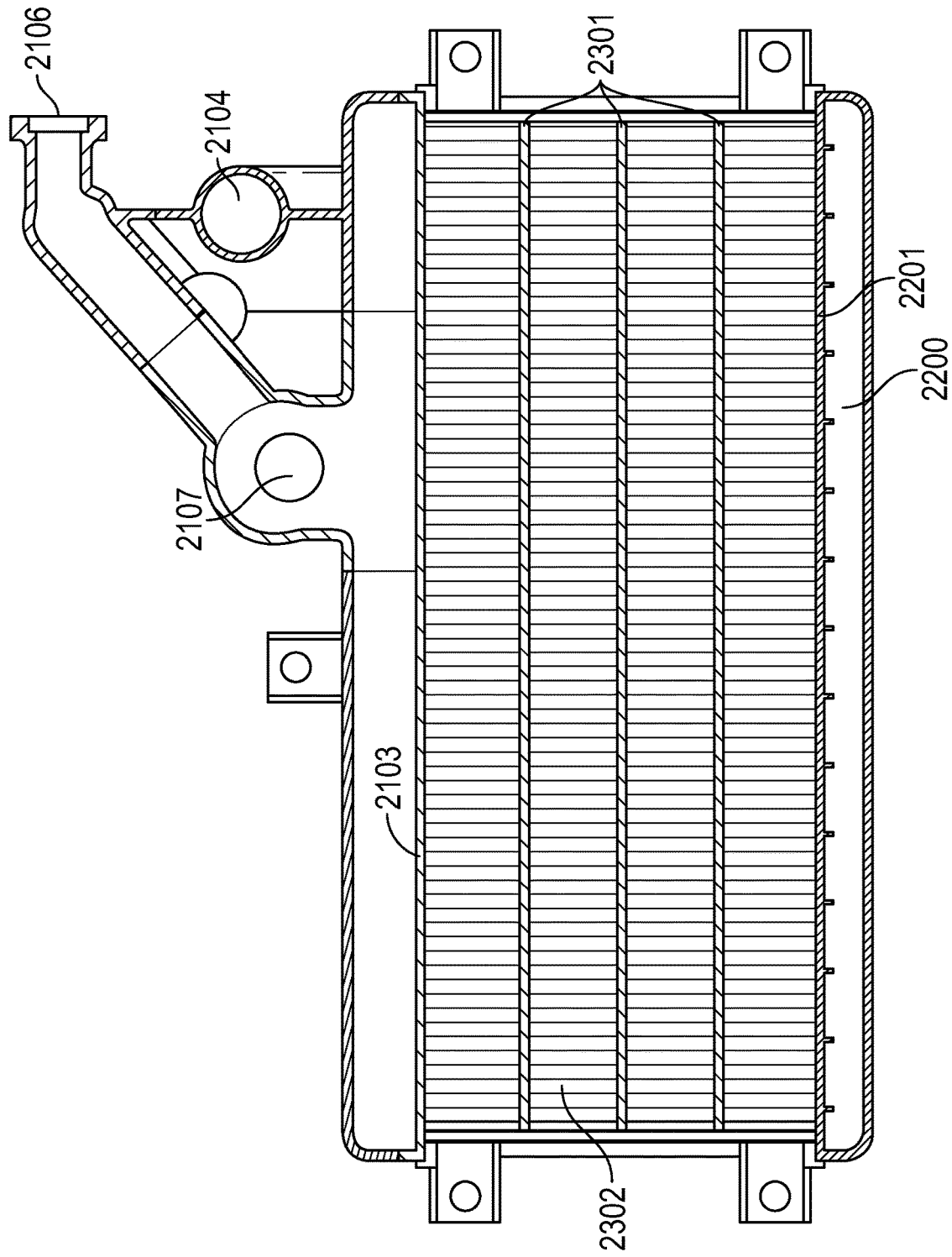
FIG. 7 is a second cross section view of a hydraulic subunit of a heat exchanger comprising three heat exchanging subunits taken on the line 7-7 of FIG. 5.
Figure 8:
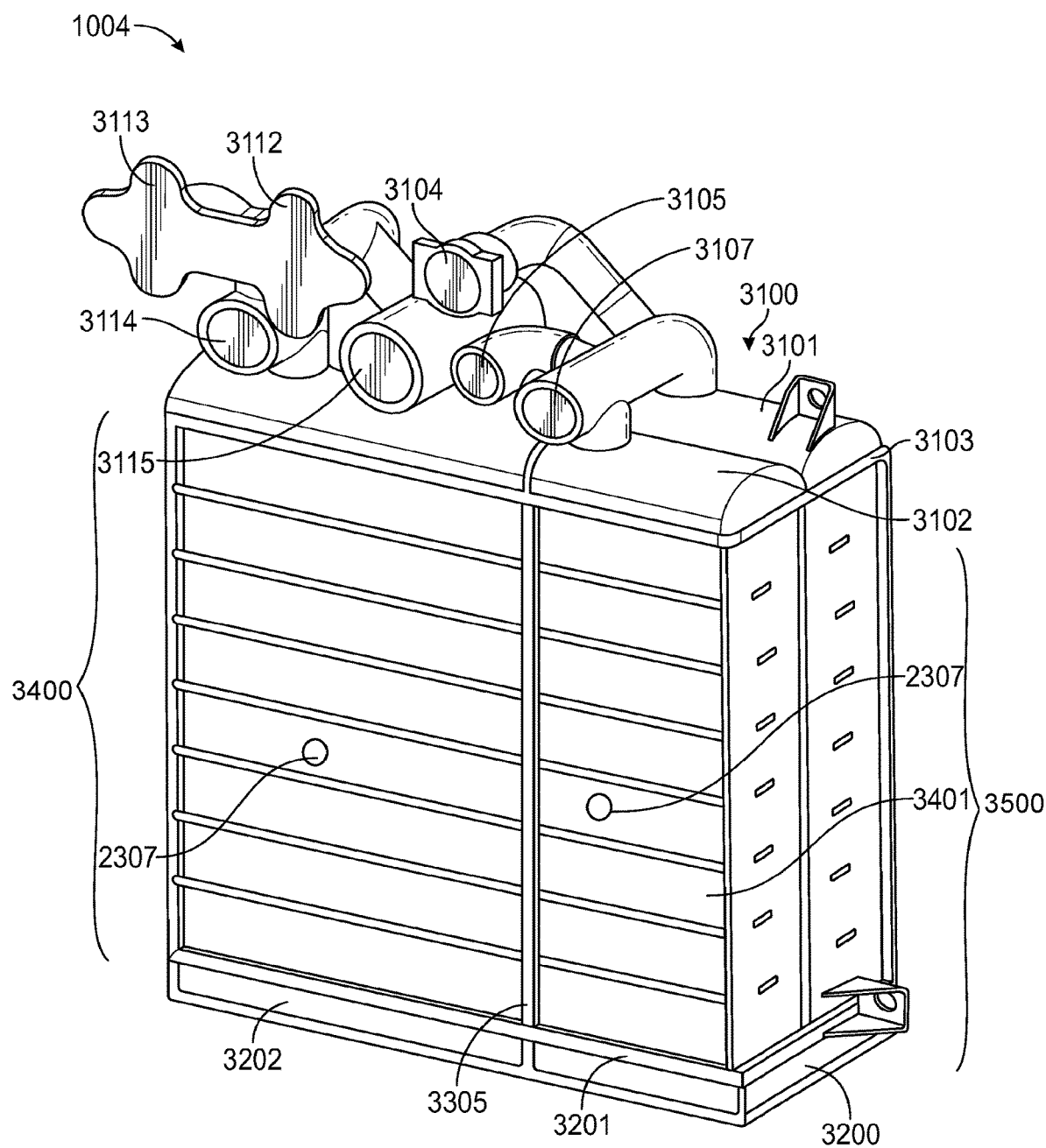
FIG. 8 is a perspective view of a TAGB/GEN subunit of a heat exchanger comprising three heat exchanging subunits.
Figure 9:
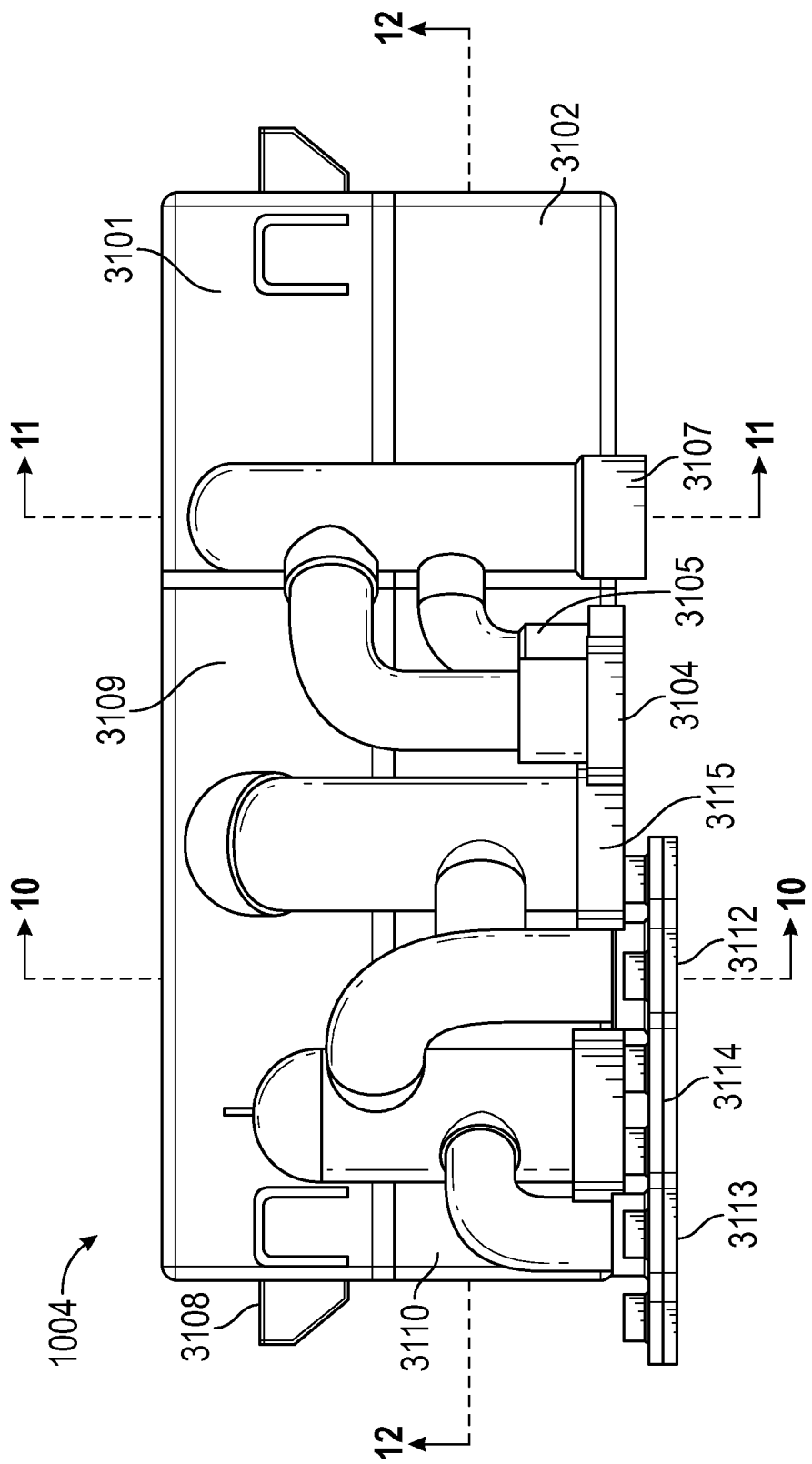
FIG. 9 is a top view of a TAGB/GEN subunit of a heat exchanger comprising three heat exchanging subunits.
Figure 10:
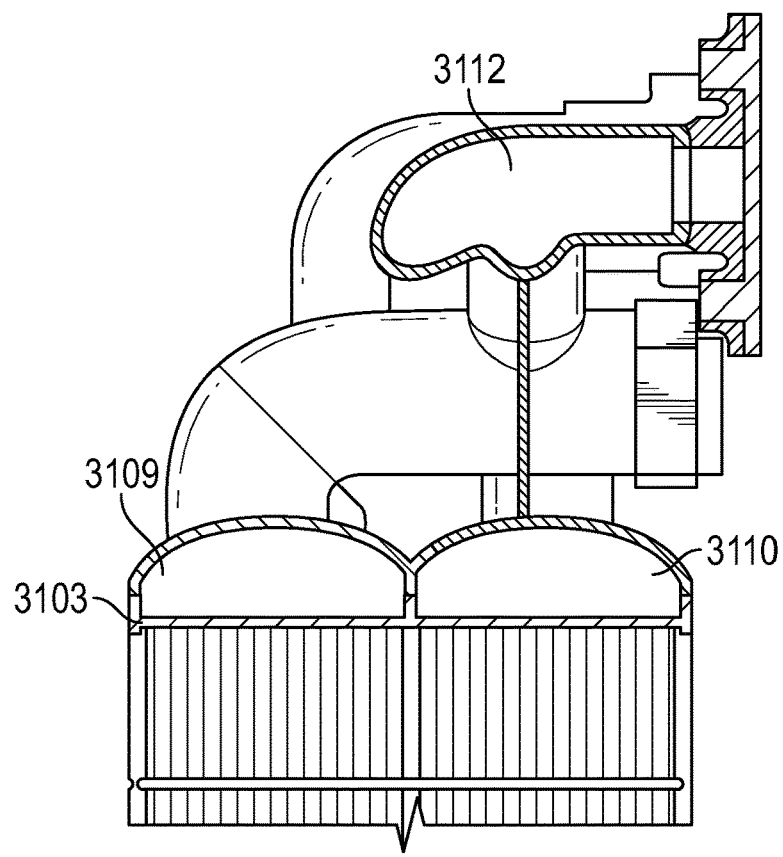
FIG. 10 is a first cross section view of a TAGB/GEN subunit of a heat exchanger comprising three heat exchanging subunits taken on the line 10-10 of FIG. 9.
Figure 11:
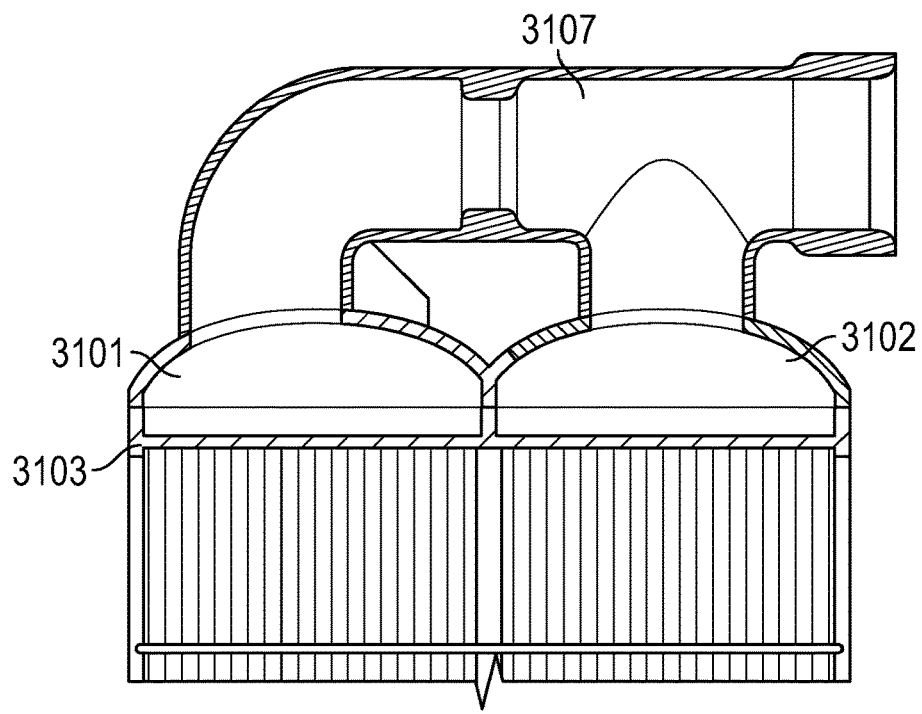
FIG. 11 is a second cross section view of a TAGB/GEN subunit of a heat exchanger comprising three heat exchanging subunits taken on the line 11-11 of FIG. 9.

As shown in FIG. 6, from the HYD inlet tank 2101, the oil flows through the HYD port tube sheet 2103 and into the microtubes 2302 (further described below) below the HYD inlet tank 2101. Oil then flows through the HYD turn tube sheet 2201 into the HYD turnside tank 2200. From the HYD turnside tank 2200 the oil flows though the HYD turn tube sheet 2201 and into the microtubes 2302 located below the HYD outlet tank 2102. Finally, the cooled oil flows out the microtubes 2302 of the core 2307, through the HYD port tube sheet 2103, into the HYD outlet tank 2102 and through the HYD outlet port 2105.

FIG. 6 further depicts the elements of the core 2307 for the HYD subunit 1005. The microtubes 2302 are attached to the HYD port tube sheet 2103 at the tops and to the HYD turn tube sheet 2201 at the bottoms. Also, midplates 2301 are spaced along the length of the microtubes 2302 to provide additional support to the microtubes 2302. Solid rods 2306 are also located along the leading face 6000 of the core 2307 (and further optionally at the trailing face of the core 2307 to prevent damage during handling of the HYD subunit 1005) at which air enters the heat exchanger 1000.

TAGB/GEN Subunit:

FIGS. 8, 9, 10, 11 and 12 depict an exemplary embodiment of the TAGB/GEN subunit 1004. The TAGB/GEN subunit 1004 comprises two side-by-side subunits—the TAGB subunit 3400 and the GEN subunit 3500.

The cores 2307 for each of the TAGB subunit 3400 and GEN subunit 3500 comprises the port tube sheet 3103, the microtubes 2302, midplates 2301, sideplates 2300 and solid rods 2306 (if present), and the turn tube sheet 3201. In practice, the core 2307 which serves both the TAGB and GEN subunits of 1004 is one assembly.

Connected above the portion of the core 2307 associated with the TAGB subunit 3400 are two parallel TAGB portside tanks 3100—a TAGB inlet tank 3109 and a TAGB outlet tank 3110. A TAGB inlet port 3112 is located above the TAGB inlet tank 3109 and the oil to be cooled is flowed through the TAGB inlet port 3112 into the TAGB inlet tank 3109. An TAGB outlet port 3113 is located above the TAGB outlet tank 3110 and the oil, after it is cooled, flows out of the TAGB outlet tank 3110, through the TAGB outlet port 3113 and away from the heat exchanger 1000. Connected to the bottom of the TAGB subunit 3400 (below the core 2307 associated with the TAGB subunit), is the TAGB turnside tank 3202. Similar to the port tube sheet 3103, the turn tube sheet 3201 separates the core 2307 from the TAGB turnside tank 3202. The TAGB subunit 3400 further comprises a TAGB bypass valve port 3114 located above the TAGB inlet tank 3109 and a TAGB oil filter port 3115.

Connected above the portion of the core 2307 associated with the GEN subunit 3500 are two parallel GEN portside tanks 3100—a GEN inlet tank 3101 and a GEN outlet tank 3102. A GEN inlet port 3104 is located above the GEN inlet tank 3101 and the oil to be cooled is flowed through the GEN inlet port 3104 into the GEN inlet tank 3101. A GEN outlet port 3105 is located above the GEN outlet tank 3102 and the oil, after it is cooled, flows out of the GEN outlet tank 3102, through the GEN outlet port 3105 and away from the heat exchanger 1000. The port tube sheet 3103 separates the GEN inlet tank 3101 and GEN outlet tank 3102 from the core 2307 of the GEN subunit 3500. At the bottom of the GEN subunit 3500 (below the core 2307), is the GEN turnside tank 3200. Similarly to the port tube sheet 3103, the turn tube sheet 3201 separates the core 2307 from the GEN turnside tank 3200. The GEN subunit 3500 further comprises a GEN bypass valve port 3107 located above the GEN inlet tank 3101.

For each of the GEN subunit 3500 and the TAGB subunit 3400, from the inlet tanks 3101, 3109, the oil flows through the port tube sheet 3103 and into the microtubes 2302 (further described below) below the inlet tanks 3101, 3109. Oil then flows through the turn tube sheet 3201 into the turnside tanks 3200, 3202. From the turnside tanks 3200, 3202 the oil flows though the turn tube sheet 3201 and through the microtubes 2302 below the outlet tanks 3102, 3110. Finally, the cooled oil flows out the microtubes 2302, through the port tube sheet 3103 into the outlet tanks 3102, 3110 and through the outlet ports 3105, 3113.

Figure 12:
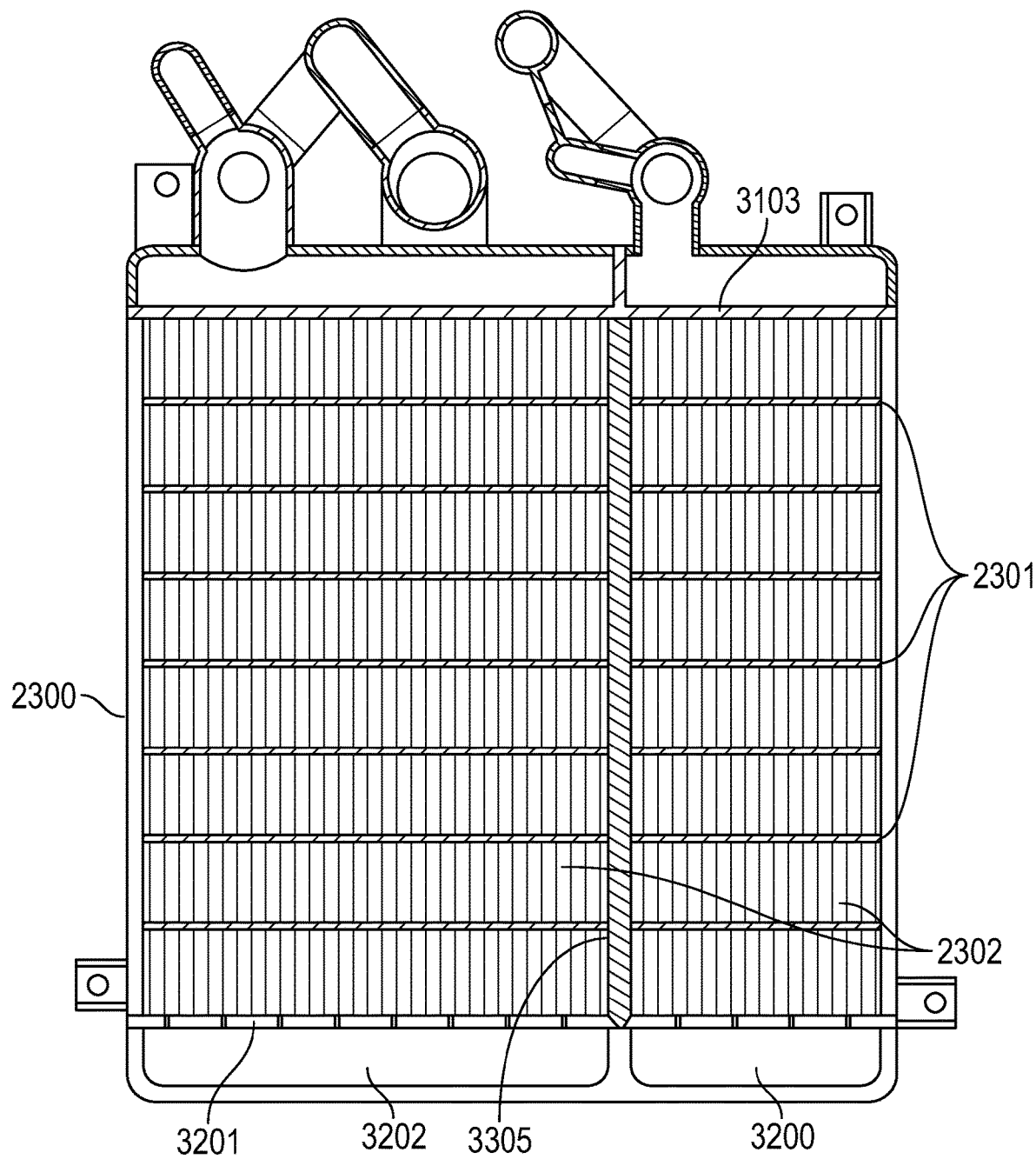
FIG. 12 is a third cross section view of a TAGB/GEN subunit of a heat exchanger comprising three heat exchanging subunits taken on the line 12-12 of FIG. 9.
Figure 13:
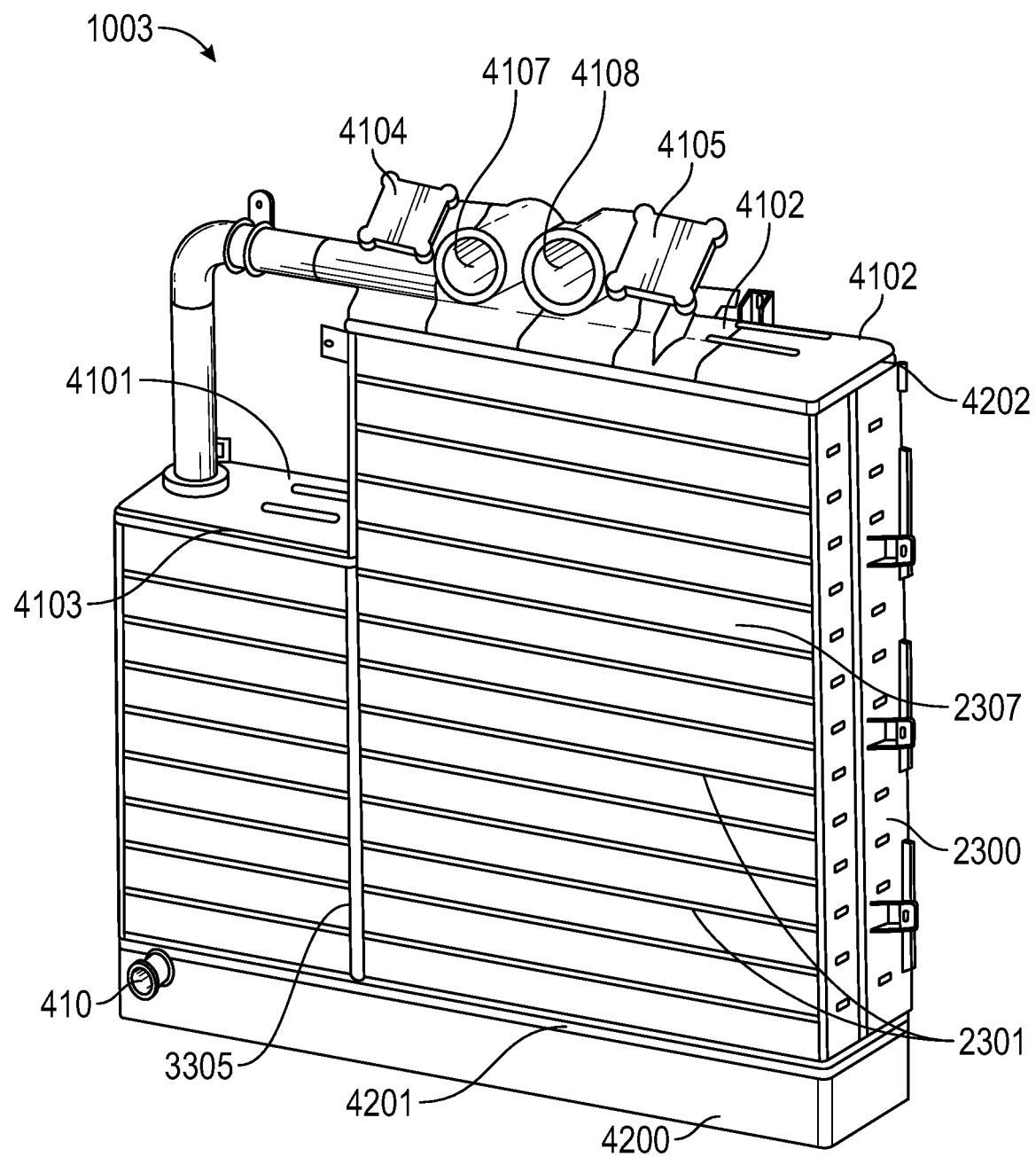
FIG. 13 is a perspective view of a PRGB subunit of a heat exchanger comprising three heat exchanging subunits.
Figure 14:
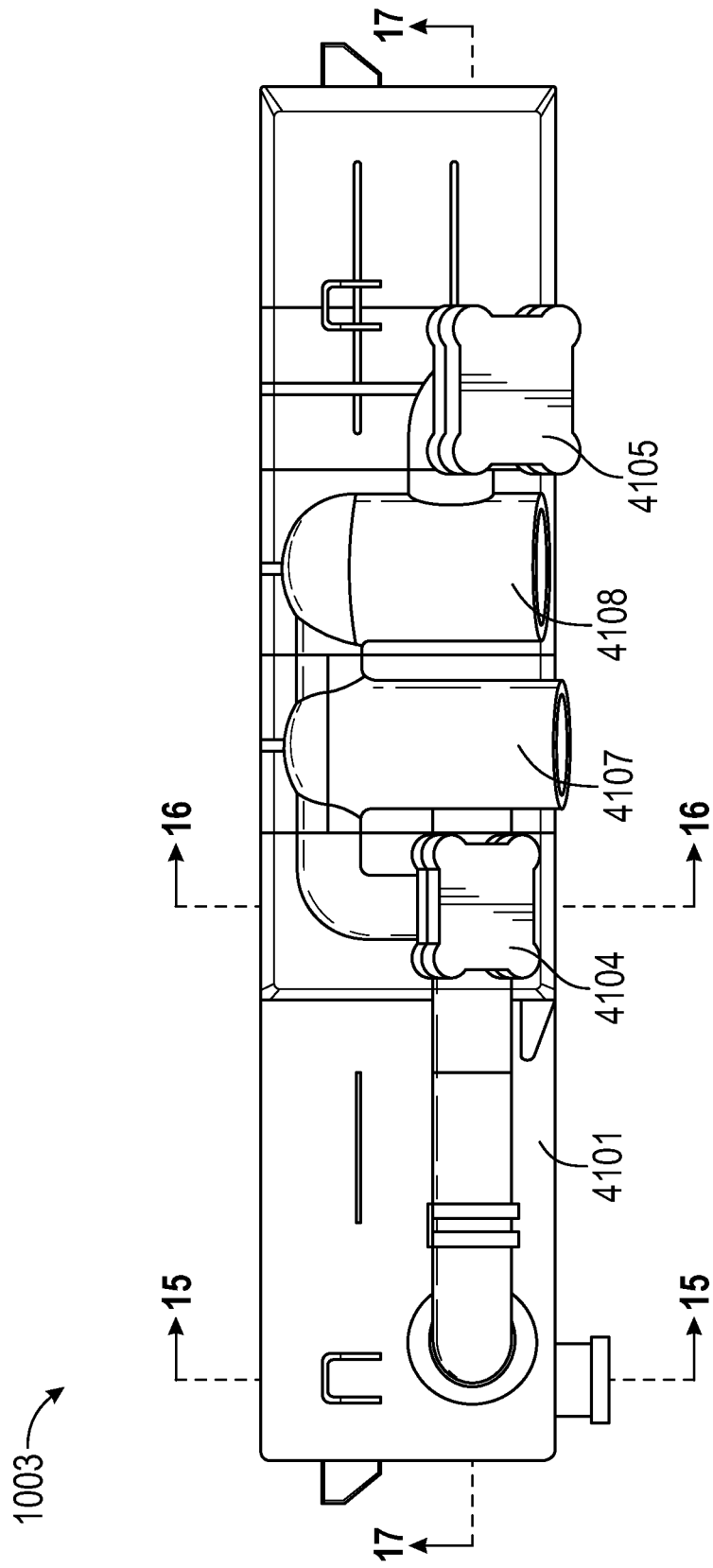
FIG. 14 is a top view of a PRGB subunit of a heat exchanger comprising three heat exchanging subunits.
Figure 15:
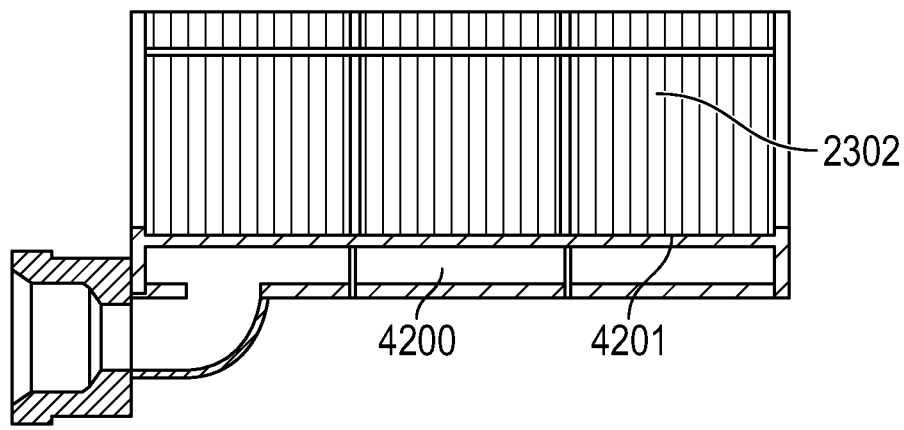
FIG. 15 is a first cross section view of a PRGB subunit of a heat exchanger comprising three heat exchanging subunits taken on the line 15-15 of FIG. 14.
Figure 16:
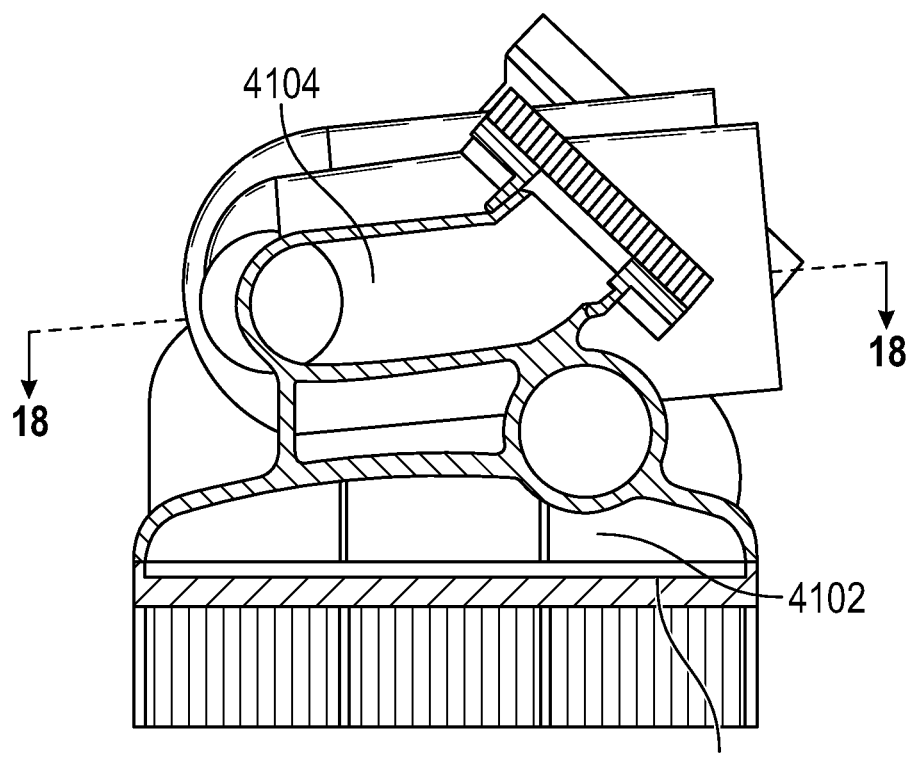
FIG. 16 is a second cross section view of a PRGB subunit of a heat exchanger comprising three heat exchanging subunits taken on the line 16-16 of FIG. 14.

FIG. 12 further depicts the elements of the cores 2307. The microtubes 2302 are attached to the port tube sheet 3103 at the top and to the turn tube sheet 3201 at the bottom. Also, midplates 2301 are spaced along the length of the microtubes 2302 to provide additional support to the core 2307. Solid rods 2306 are also located on the front face of the cores 2307 at which air enters the heat exchanger 1000.

PRGB Subunit

FIGS. 13, 14, 15, 16, 17 and 18 depict an exemplary embodiment of the PRGB subunit 1003. PRGB subunit 1003 is comprised of two PRGB cores 2307—the inlet core 4300 (comprising the microtubes 2302 transporting oil from the PRGB inlet tank 4101 to the PRGB turnside tank 4200) and the outlet core 4301 (comprising the microtubes 2302 transporting oil from the PRGB turnside tank 4200 to the PRGB outlet tank 4102). The inlet core 4300 is located beside the outlet core 4301. PRGB subunit 1003 further comprises two PRGB portside tanks—a PRGB inlet tank 4101 located above the PRGB inlet core 4300 and the PRGB outlet tank 4102 above the PRGB outlet core 4301. The PRGB turnside tank 4200 and PRGB turn tube sheet 4201 extend below both the PRGB inlet core 4300 and the PRGB outlet core 4301. The PRGB subunit 1003 further comprises a PRGB oil filter port 4107 and a PRGB bypass valve port 4108.

A PRGB inlet port 4104 is located above the PRGB outlet tank 4102 and the oil to be cooled is flowed through the PRGB inlet port 4104 into the PRGB inlet tank 4101 through an inlet pipe 4203. A PRGB outlet port 4105 is located above the PRGB outlet tank 4102 and the oil, after it is cooled, flows out of the PRGB outlet tank 4102, through the PRGB outlet port 4105 and away from the heat exchanger 1000. Each of the PRGB inlet and outlet cores 4300, 4301 comprise microtubes 2302, midplates 2301, sideplates 2300 and solid rods 2306.

Figure 17:
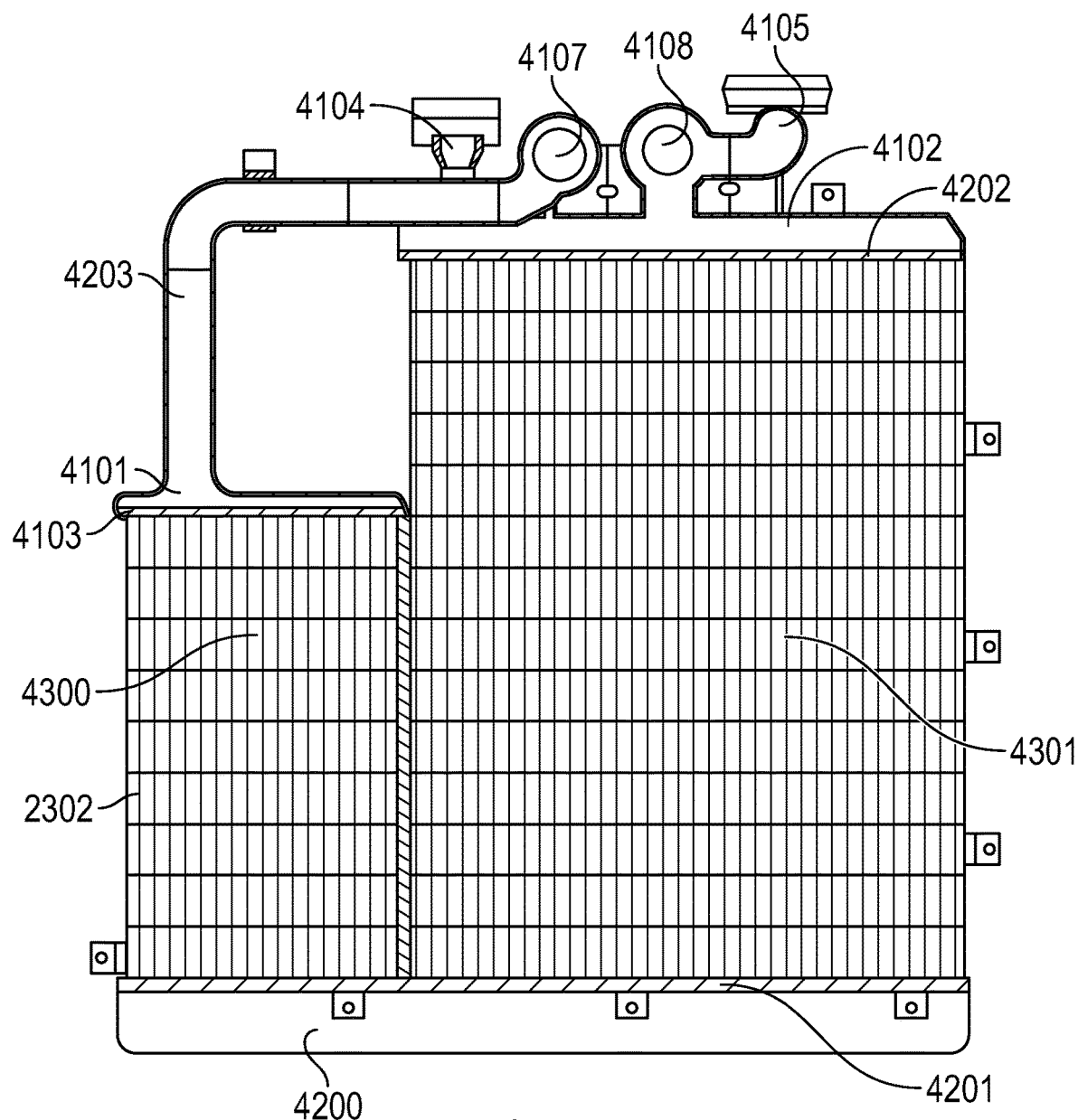
FIG. 17 is a third cross section view of a PRGB subunit of a heat exchanger comprising three heat exchanging subunits taken on the line 17-17 of FIG. 14.
Figure 18:
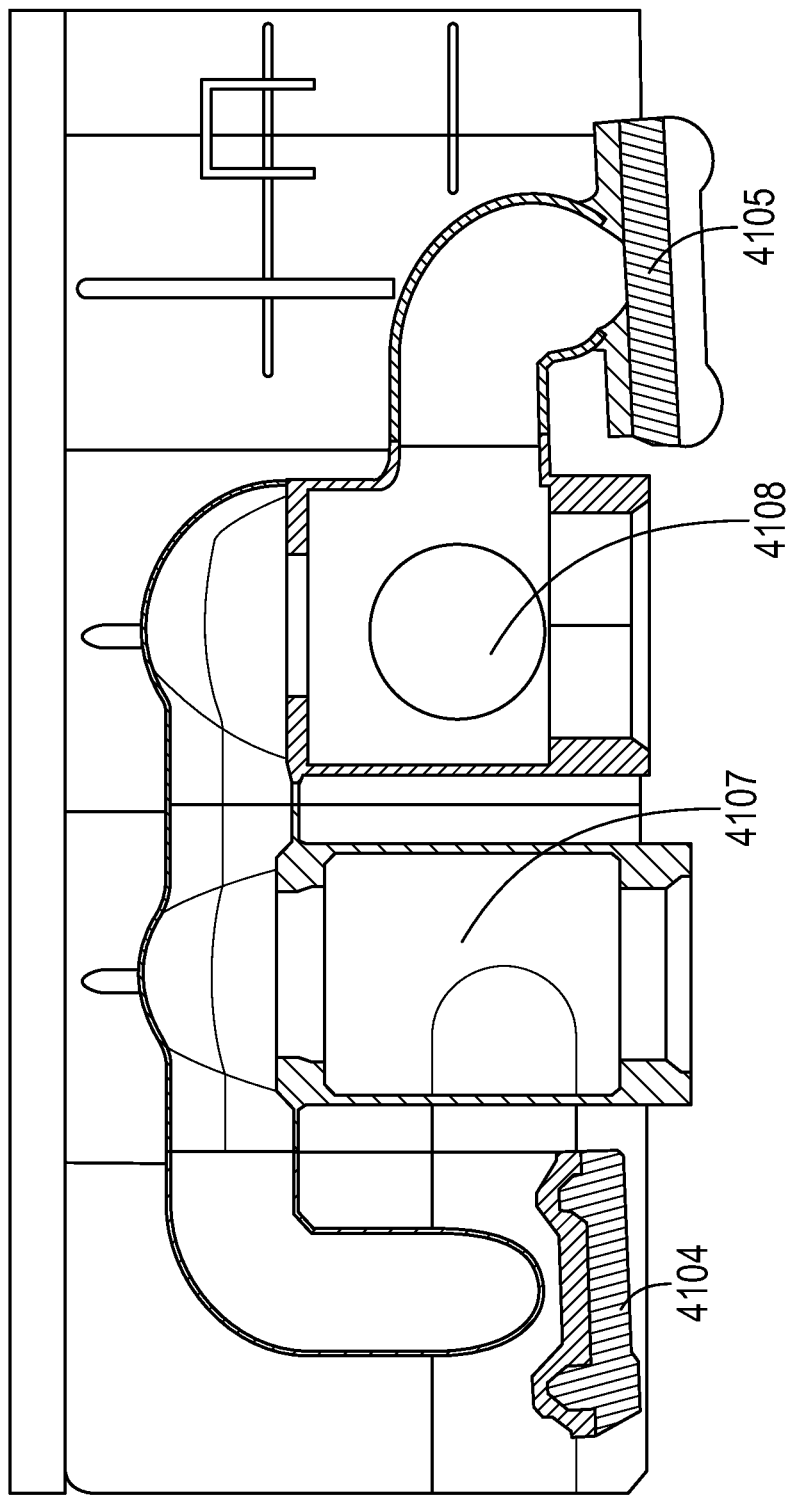
FIG. 18 is a fourth cross section view of a PRGB subunit of a heat exchanger comprising three heat exchanging subunits taken on the line 18-18 of FIG. 16.

As shown in FIG. 17, from the PRGB inlet tank 4101, the oil flows through the PRGB inlet port tube sheet 4103 and into the microtubes 2302 (further described below) of the PRGB inlet core 4300. Oil then flows through the PRGB turn tube sheet 4201 into the PRGB turnside tank 4200. From the PRGB turnside tank 4200 the oil flows though the PRGB turn tube sheet 4201 below the PRGB outlet core 4301 and into the microtubes 2302 of the PRGB outlet core 4301. Finally, the cooled oil flows out the microtubes 2302 of the PRGB outlet core 4301, through the PRGB outlet tube sheet 4202, into the PRGB outlet tank 4102 and through the PRGB outlet port 4105.

FIG. 17 further depicts the elements of the PRGB inlet and outlet cores 4300, 4301. The microtubes 2302 are attached to the PRGB inlet and outlet port tube sheets 4103, 4202 at the top and to the PRGB turn tube sheet 4201 at the bottom. Also, midplates 2301 are spaced along the length of the microtubes 2302 to provide additional support to the cores 4300, 4301. Solid rods 2306 are also located along the leading face (and further optionally at the trailing face of the core to prevent damage during handling of the PRGB subunit 1003) of the core at which air enters the heat exchanger 1000.

Fluid Flow

Figure 21A:
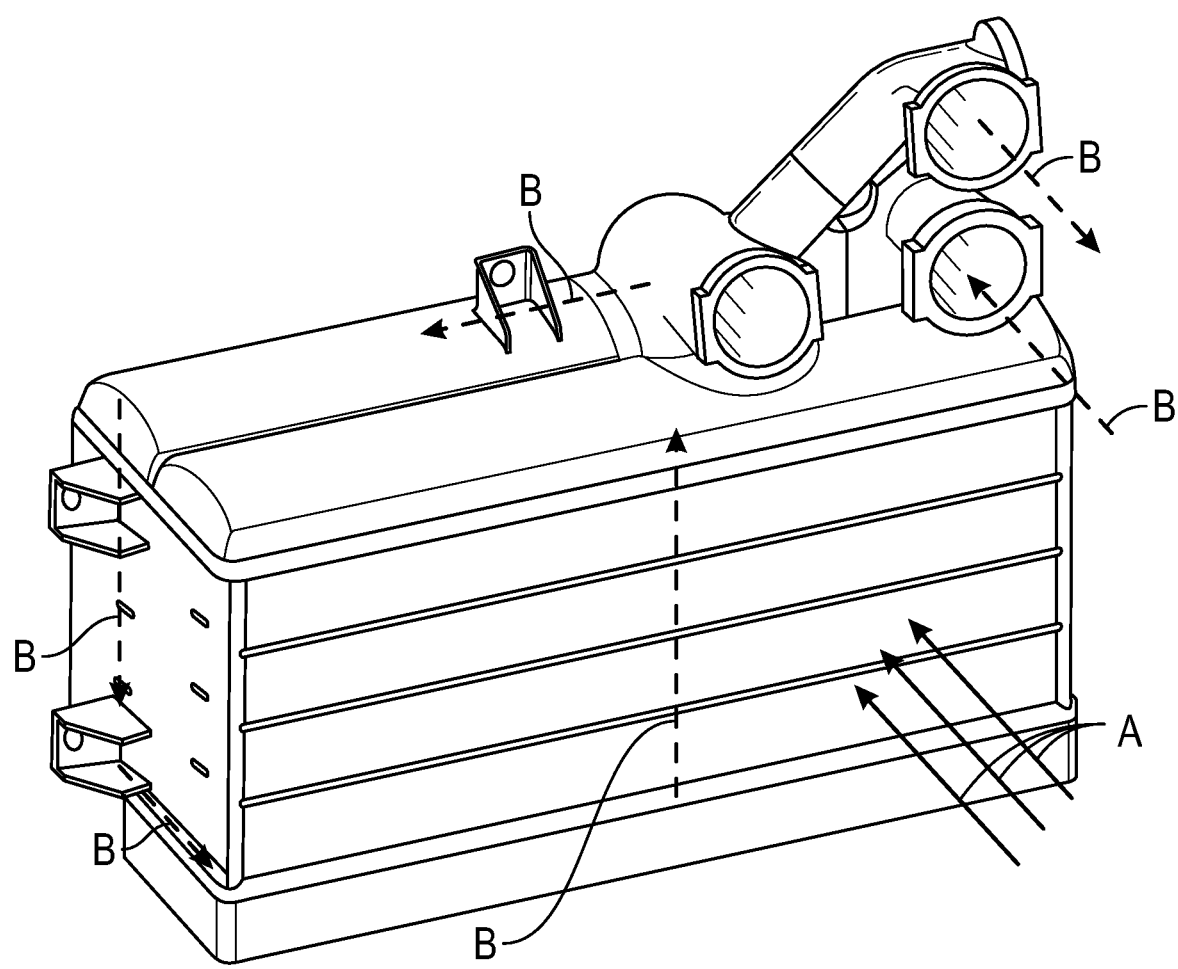
FIG. 21A is a flow diagram of hydraulic fluid flow and ambient air flow of a HYD subunit of a heat exchanger comprising three heat exchanging subunits.
Figure 21B:
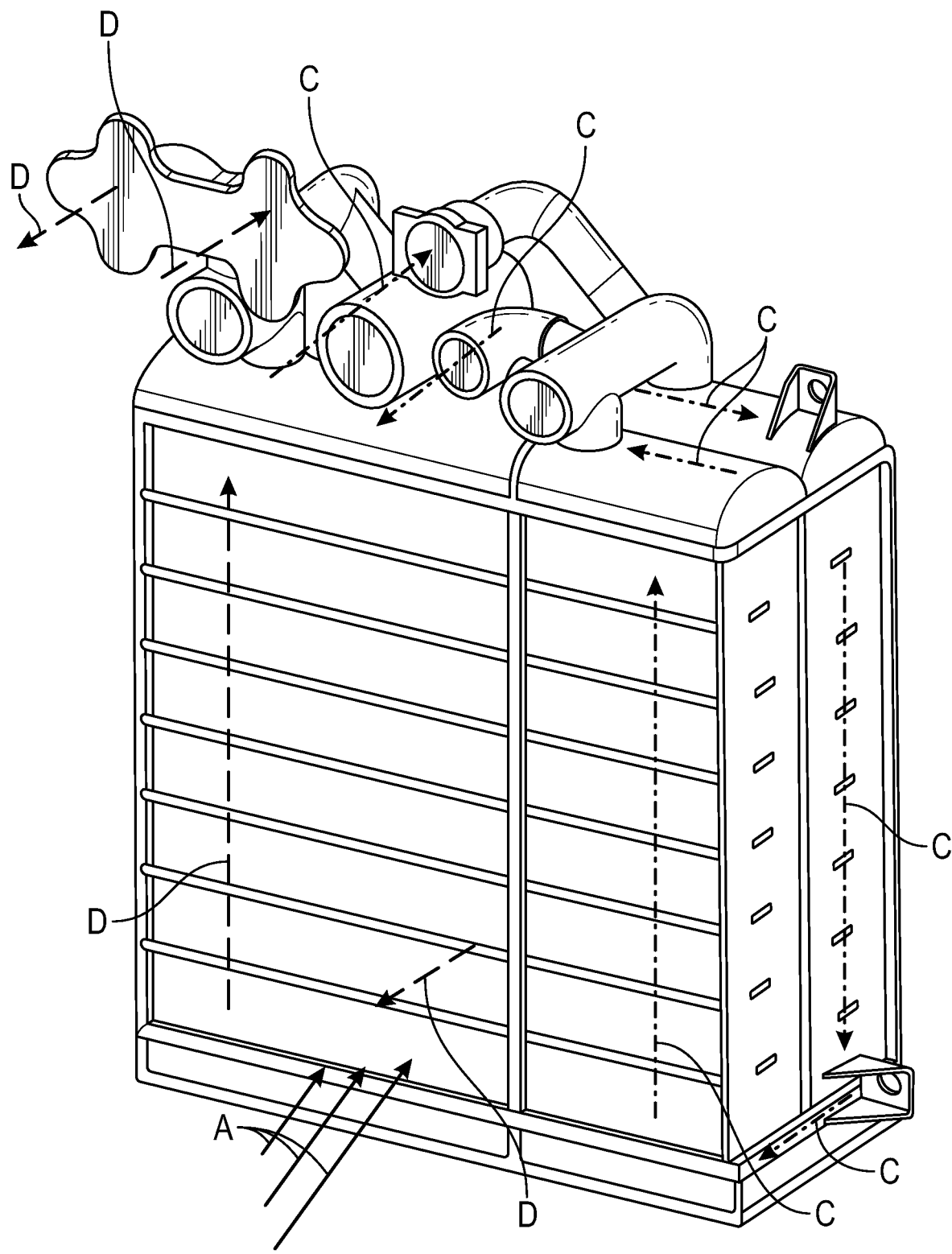
FIG. 21B is a flow diagram of a fluid of TAGB and GEN units and an ambient air flow of a TAGB/GEN subunit of a heat exchanger comprising three heat exchanging subunits.
Figure 21C:
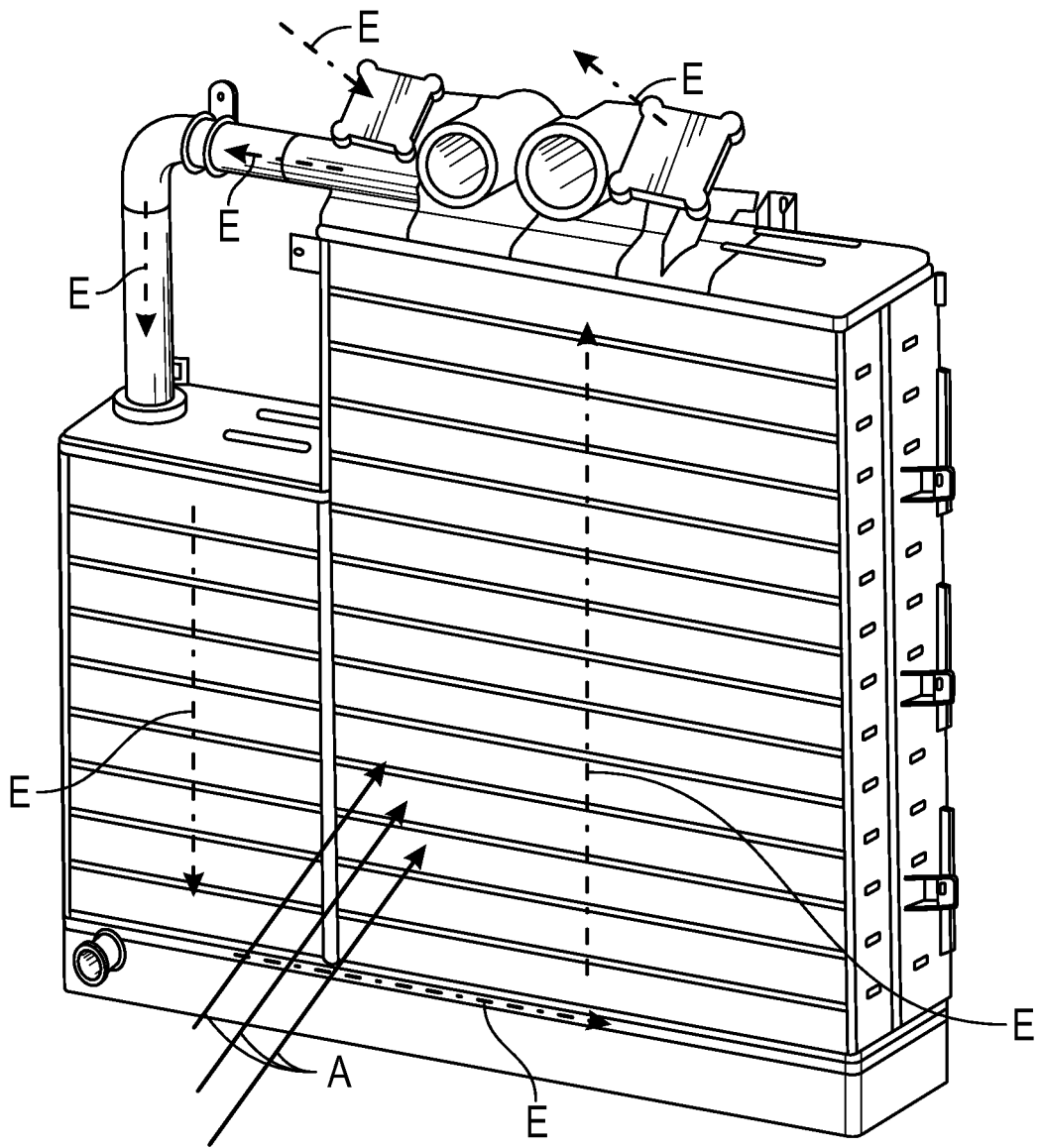
FIG. 21C is a flow diagram of a fluid of a PRGB subunit and an ambient air flow of a PRGB subunit of a heat exchanger comprising three heat exchanging subunits.
Figure 21D:
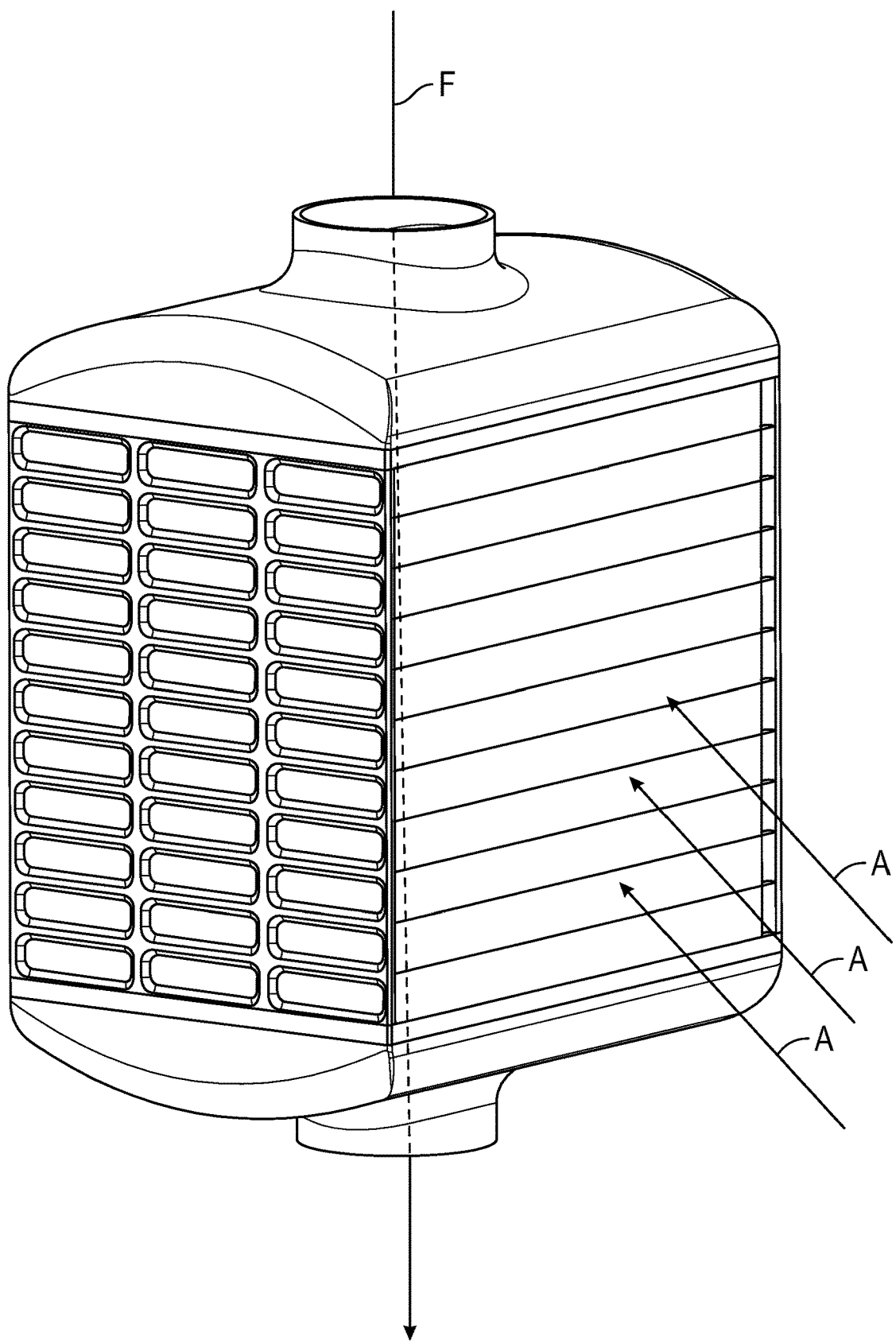
FIG. 21D is a flow diagram of a fluid and an ambient air flow of a single unit heat exchanger.

As shown in FIG. 21D, the single unit heat exchanging unit 1100 comprises a cross-flow, one-pass design. This figure further shows the pathway of the bleed air (F) through the heat exchanging unit 1100—entering through the inlet port 1105 and flowing to the inlet tank 1101. From the inlet tank 1101 the bleed air flows through the inlet tube sheet 1103 and into the microtubes 2302. Upon leaving the microtubes, the bleed air flows through the outlet tube sheet 1104, into the outlet tank 1102 and out through the outlet port 1106. At the same time that the bleed air (F) is taking this path, the surrounding air (A) is drawn through the core 2307 and around the microtubes 2302. The heat of the bleed air (F) is transferred through the walls of the microtubes 2302 to the surrounding air (A) thereby resulting in the cooling of the bleed air (F).

As shown in FIG. 21A and B, the HYD subunit 1005 and the TAGB/GEN subunit 1004 each comprise a cross flow—counter flow, two-pass design. In a cross flow—counter flow design, the first fluid flow (i.e., the flow of the oil) makes at least two passes through the heat exchanger, with each pass being progressively closer to the front face of the heat exchanger. Macroscopically, the oil enters core near the back of the heat exchanger and exits near the front. The air, on the other hand, enters the front face of the heat exchanger and exits the back face. Each individual pass defines cross flow (the fluid velocities of the two fluids are orthogonal to each other), but macroscopically, the oil flows from the back of the heat exchanger forward, while the air flows in the opposite direction. This is the definition of counter flow. As is typical of two pass cross flow-counter flow heat exchangers, one fluid enters and exits on the same end of the heat exchanger 1003-1005.

FIG. 21A shows the pathway of the hydraulic fluid (B) through the HYD subunit 1005—entering through the HYD inlet port 2104, into the HYD inlet tank 2101, down through the microtubes 2302 (located underneath the HYD inlet tank 2101) of the core 2307, into the HYD turnside tank 2200, up through the microtubes 2302 (located underneath the HYD outlet tank 2102) of the core 2307, into the HYD outlet tank 2102 and out through the HYD outlet port 2105. At the same time that the hydraulic fluid (B) is taking this path, the surrounding air (A) is being drawn through the core 2307 and around the microtubes 2302. The heat of the hydraulic fluid (B) is transferred through the walls of the microtubes 2302 to the surrounding air (A) thereby resulting in the cooling of the hydraulic fluid (B).

FIG. 21B shows the pathway of two separate fluids—the GEN fluid (C) and the TAGB fluid (D)—through the TAGB/GEN subunit 1004. The GEN fluid (C) enters through the GEN inlet port 3104, into the GEN inlet tank 3101, down through the microtubes 2302 (located underneath the GEN inlet tank 3101) of the core 2307, into the GEN turnside tank 3200, up through the microtubes 2302 (located underneath the GEN outlet tank 3102) of the core 2307, into the GEN outlet tank 3102 and out through the GEN outlet port 3105. The TAGB fluid (D) enters through the TAGB inlet port 3112, into the TAGB inlet tank 3109, down through the microtubes 2302 (located underneath the TAGB inlet tank 3109) of the core 2307, into the TAGB turnside tank 3202, up through the microtubes 2302 (located underneath the TAGB outlet tank 3110) of the core 2307, into the TAGB outlet tank 3110 and out through the TAGB outlet port 3113. At the same time that the GEN fluid (C) and/or the TAGB fluid (D) is taking these paths, the surrounding air (A) is being drawn through the core 2307 and around the microtubes 2302. The heat of the GEN fluid (C) and the TAGB fluid (D) is transferred through the walls of the microtubes 2302 to the surrounding air (A) thereby resulting in the cooling of the GEN fluid (C) and the TAGB fluid (D).

As shown in FIG. 21C, the PRGB subunit 1003 comprises a transverse (u-turn), two-pass design and shows the pathway of the PRGB fluid (E) through the PRGB subunit 1003. Unlike the cross flow—counter flow design where the macroscopic flow of the fluid in progressive cross flow passes is in a direction opposite the air velocity, in a transverse cross flow design, the macroscopic flow of fluid in progressive cross flow passes typically is in a direction orthogonal to the direction of the air flow. The PRGB fluid (E) enters through the PRGB inlet port 4104, through the 4203 inlet pipe, into the PRGB inlet tank 4101, down through the microtubes 2302 (located underneath the PRGB inlet tank 4101) of the core 2307, into the PRGB turnside tank 4200, up through the microtubes 2302 (located underneath the PRGB outlet tank 4102) of the core 2307, into the PRGB outlet tank 4102 and out through the PRGB outlet port 4105. At the same time that the PRGB fluid (E) is taking this path, the surrounding air (A) is being drawn through the core 2307 and around the microtubes 2302. The heat of the PRGB fluid (E) is transferred through the walls of the microtubes 2302 to the surrounding air (A) thereby resulting in the cooling of the PRGB fluid (E).

Figure 19:
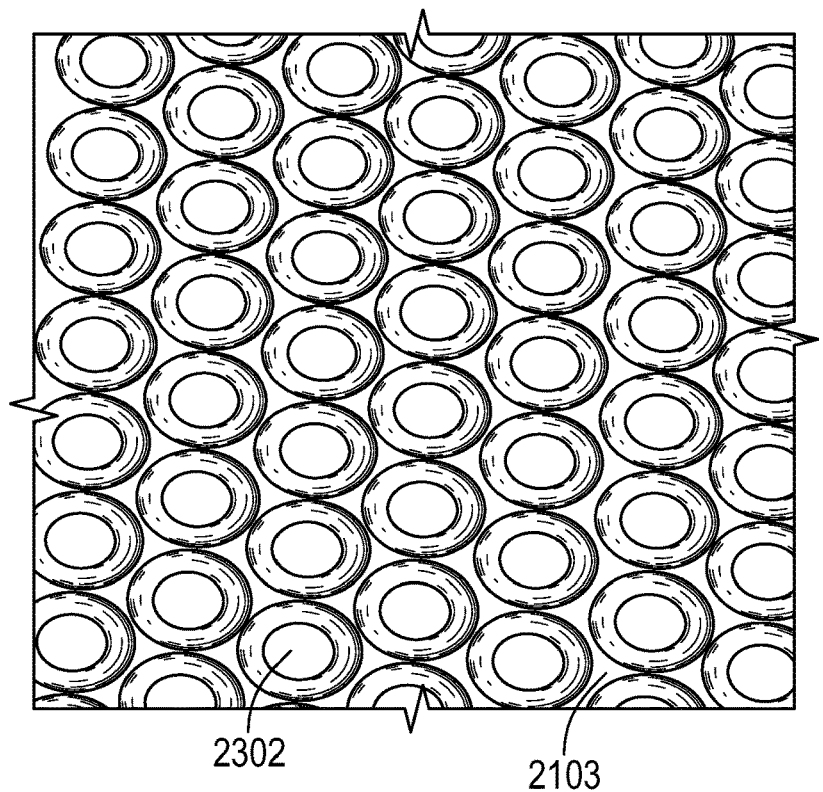
FIG. 19 is a top view of an array of microtubes welded to an array of tube apertures of a tube sheet.
Figure 20:
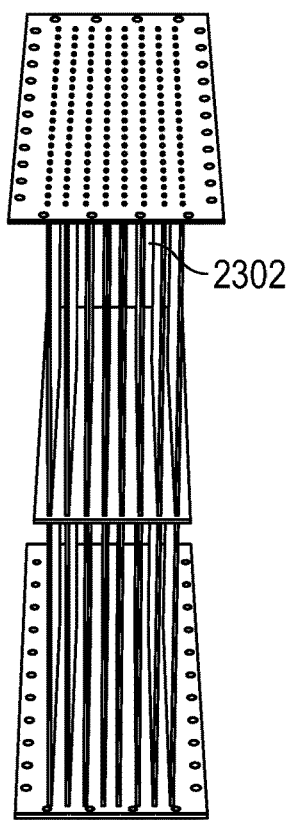
FIG. 20 is an exemplary pattern of an array of microtubes of a heat exchanger in a rectangular pattern.

The cores 2308 of each of the single unit heat exchanger 1000, the PRGB subunit 1003, the TAGB/GEN subunit 1004 and the HYD subunit 1005 comprise a plurality of microtubes 2302. Microtubes 2302 are laser welded to an exemplary tube sheet are shown in FIG. 19 and an exemplary in-line pattern of an array of laser welded microtubes 2302 is shown in FIG. 20. By way of example, an ytterbium fiber laser (such as the YLR-MM laser sold by IPG Photonics) may be used for the laser welding. In one embodiment a thin layer of epoxy is also deposited on the backside of the laser-welded joints thereby providing a redundant mechanism for additional strength and creation of a leak tight joint.

The microtubes 2302 transport a first fluid (i.e., lubricating oil or bleed air) to be cooled while a second fluid (i.e., air) flows over the outer surface of the microtubes 2302. The temperature differential between the hotter first fluid compared to the cooler second fluid results in the exchange of heat between the fluids.

The number of microtubes 2302 provided will depend on the design chosen and the performance requirements desired. In certain embodiments, the heat exchanger 1000 will utilize thousands, tens of thousands, or even millions of microtubes 2302. In one embodiment, the heat exchanging unit 1100 comprises between 5,000 and 15,000 microtubes. In one embodiment the PRGB subunit 1003 comprises around 4,000 microtubes 2302 in the first pass (from PRGB inlet tube sheet 4103 to PRGB turn tube sheet 4201) and around 7,000 microtubes 2302 in the second pass (from PRGB turn tube sheet 4201 to PRGB outlet tube sheet 4202); the TAGB/GEN subunit 1004 comprises around 4,000 microtubes 2302 (around 2,500 microtubes 2302 in the TAGB subunit 3400 and around 1,500 in the GEN subunit 3401); and the HYD subunit 1005 comprises around 5,000 microtubes 2302.

Microtubes 2302 may have an outer diameter of less than 3.5 mm, but most commonly the outer diameter is between around 0.5 mm (0.020 inches) and 2.0 mm (0.08 inches). Microtubes 2302 typically may be made from polymer or metal alloys. Such metal alloys may include steel, nickel alloy, aluminum or titanium. In one embodiment the microtubes 2302 are made of 304 stainless steel or Inconel 625.

The plurality of microtubes 2302 are substantially parallel to each and other and are substantially perpendicular to the inlet or port tube sheets 1103, 2103, 3103, 4103, 4202 and the outlet or turn tube sheets 1104, 2201, 3201, 4201. The microtubes 2302 are also substantially perpendicular to one or more midplates 2301. The midplates 2301 are located between an inlet or port tube sheets 1103, 2103, 3103, 4103, 4202 and an outlet or turn tube sheet 1104, 2201, 3201, 4201 with the microtubes 2302 extending through the midplates 2301. The number of midplates 2301 (or the existence of them at all) and the location of the midplates 2301 will be a design consideration dependent, amongst other considerations, on the physical characteristics of the heat exchanger 1000.

The inlet tube sheets, outlet tube sheets, port tube sheets, turn tube sheets and midplates (when present), each comprise an array of tube apertures 5000 in a certain pattern. The pattern of the array of tube apertures 5000 for corresponding inlet tube sheets, outlet tube sheets, port tube sheets, turn tube sheets and midplates shall be substantially identical. The pattern of the array of tube apertures 5000 defines the spacing/position of the microtubes 2302 in the heat exchanger 1000.

Figure 22:
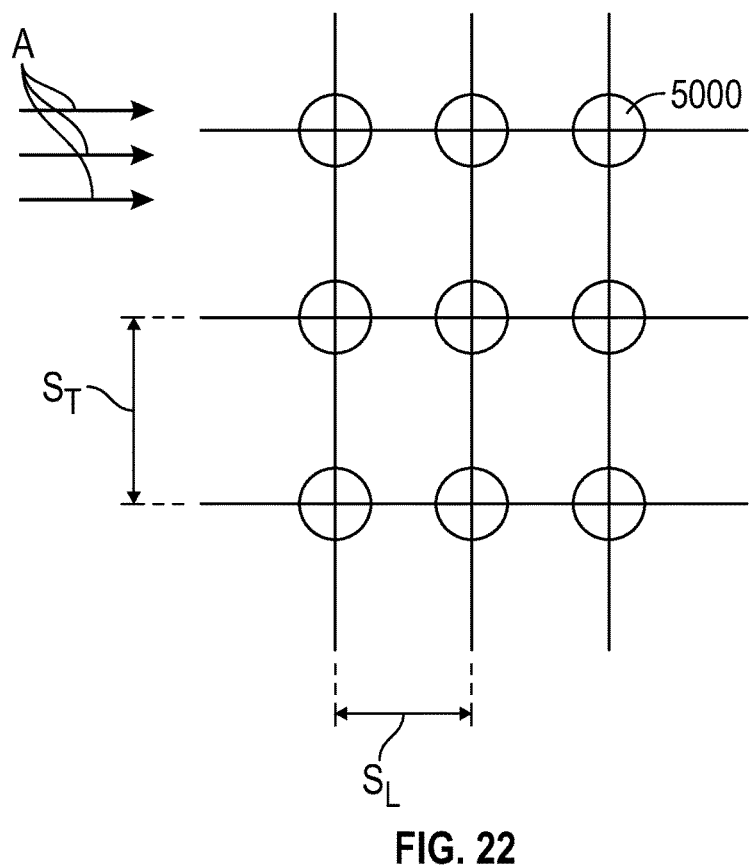
FIG. 22 shows spacing of apertures of an array of microtubes in a rectangular pattern.

In one embodiment of the instant invention, the microtubes 2302 are circular in shape and configured in rectangular (or sometime referred to as "in-line") pattern, as depicted in FIG. 22. In one exemplary embodiment, the microtubes 2302 have an outer diameter of less than 3.5 mm. In another exemplary embodiment, the microtubes 2302 have an outer diameter between around 0.5 mm and 2.0 mm.

In such a rectangular pattern, the distance between the centers of the microtubes 2302 in the longitudinal direction (or, in other words, in the direction as the air flow A) is referred to as the longitudinal distance ($S_L$) and the distance between the centers of the microtubes 2302 in the transverse direction (or, in other words, in the direction perpendicular to the direction of the air flow A) is referred to as the transverse distance (ST). In one embodiment, the longitudinal distance is less than the transverse distance, and the transverse distance is greater than two times the outer diameter of the microtube. In one embodiment, the longitudinal distance is one and one-half (1.5) times the outer diameter of the microtube 2302 and the transverse distance is three (3) times the outer diameter of the microtube 2302. In another embodiment, the longitudinal distance is between 1.25 and 1.75 times the outer diameter of said microtube and said transverse distance is between 2.0 and 5.5 times the outer diameter of said microtube.

The rectangular array pattern is advantageous because sand and dust easily pass around the microtubes 2302 thereby preventing fouling of the heat exchanger 1000. The largest sand particle is generally less than 1 mm (approximately 0.040 inches), so we speculate that virtually all sand and dust will pass through the microtubes 2302 of the aforementioned embodiment. Additionally, the rectangular array pattern is relatively easy to clean, and can usually be easily cleaned using a high-pressure air gun and without requiring removal of the heat exchanger 1000 from the aircraft.

Rectangular array patterns of microtubes 2302 have enhanced thermal performance characteristics. It will seldom be the case that within the spacial envelope of a given heat exchanger 1000 and with given flow rates of air and fluid, that microtube heat exchangers cannot provide a superior, or at least very competitive, combination of heat transfer and air-side pressure drop compared to more conventional architectures (such as plate-fin heat exchangers). In other words, in the present microtube heat exchanger invention, the improved benefits with respect to fouling resistance or weight savings are achieved without sacrificing thermal performance and compactness. In summary, the combination of the use of the microtubes and the rectangular pattern is important and unique.

As an additional benefit, when experiencing the same face velocities (the velocity of the air entering the heat exchanger), the rectangular microtube array pattern results in an air side pressure drop typically 30-40% lower than aluminum plate-fin products thereby resulting in a more efficient heat exchanger.

Figure 23:
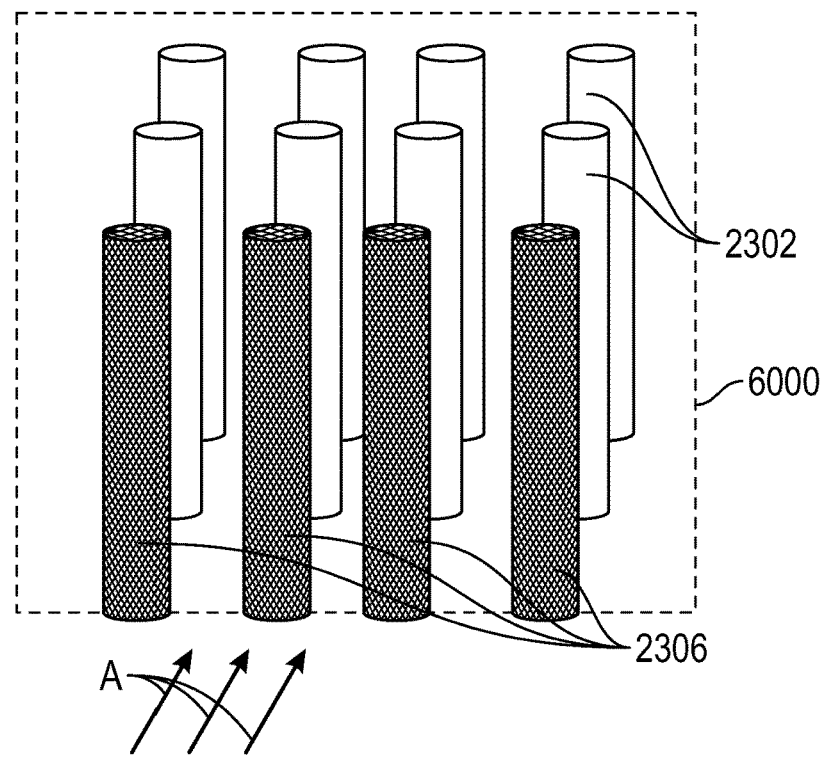
FIG. 23 depicts use of solid rods located along a leading face of a core.

FIG. 23 also depicts the use of solid rods 2306 located along the leading face (or, in other words, the face at which the air enters the core) of the core 2307. These solid rods 2306 are typically of the same diameter as the microtubes 2302 within the core 2307 and made of the same material as the core 2307 (usually stainless steel). The array of microtubes 2302 are shielded behind solid rods 2306, and thus the solid rods 2306 protect the microtubes 2302 from damage due to high velocity debris entering the heat exchanger 1000. It should be noted that the stainless steel microtubes 2302 are tough, even without the protection provided by the solid rods 2306, and resist damage fairly well from high velocity debris. Further, optionally, solid rods 2306 may be located at the trailing face of the core to prevent damage during handling of the heat exchanger 1000. In alternative embodiment that solid rods 2306 may be replaced with thick-walled tubes wherein the diameter of the wall of the thick-walled tubes are at least twice as thick as the diameter of the microtubes 2302.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof as permitted as a matter of law.

That which is claimed is:

1. An heat exchanging unit comprising:
    a baseplate;
    multiple heat exchanging subunits attached to said baseplate wherein each of said multiple heat exchanging subunits are capable of cooling a separate fluid, and wherein each of said heat exchanging subunits comprises:
    a core, wherein said core is comprised of:
    a plurality of microtubes having a center, an outer diameter, first end and a second end, and wherein said plurality of microtubes are arranged so that each of said plurality of microtubes are parallel to each other and in a rectangular in-line array pattern so a transverse distance exists between said center of each microtube and a longitudinal distance exists between the center of each microtube;
    a first tube sheet and a second tube sheet wherein said first and second tube sheets are substantially planar and parallel to each other and each of said first and second tube sheets comprise an array of tube apertures, and wherein said array of tube apertures of said first tube sheet are adjacent to said first ends of said plurality of microtubes and said array of tube apertures of said second tube sheet are adjacent to said second ends of said plurality of microtubes; and
    a laser welded metal bond wherein said laser welded metal bond joins each of said first ends of the plurality of microtubes to said first tube sheet and joins each of said second ends of said plurality of microtubes to said second tube sheet.

2. The heat exchanger unit of claim 1 wherein said longitudinal distance is between 1.25 and 1.75 times longer than said outer diameter of said microtube and said transverse distance is between 2.0 and 5.5 times longer than said outer diameter of said microtube.

3. The heat exchanging unit of claim 1 wherein said cores further comprises a leading face and a plurality of solid rods wherein each of said solid rods is located at said leading face of said cores and are in-line with said plurality of microtubes.

4. The heat exchanging unit of claim 1 further comprising: at least one midplate wherein said midplate is located between said first tube sheet and said second tube sheet.

5. The heat exchanging unit of claim 1 wherein said microtubes have an outer diameter of less than 3.5 mm.

6. The heat exchanging unit of claim 1 further comprising a layer of epoxy deposited on a backside of said laser welded metal bond.

* * * * *